US011418281B2

(12) United States Patent
Newman et al.

(10) Patent No.: US 11,418,281 B2
(45) Date of Patent: Aug. 16, 2022

(54) ERROR CORRECTION BY MERGING COPIES OF 5G/6G MESSAGES

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palo Verdes, CA (US)

( * ) Notice: Subject to any disclaimer, the term of this patent is extended or adjusted under 35 U.S.C. 154(b) by 0 days.

(21) Appl. No.: 17/579,742

(22) Filed: Jan. 20, 2022

(65) Prior Publication Data

US 2022/0140938 A1 May 5, 2022

Related U.S. Application Data

(60) Provisional application No. 63/282,770, filed on Nov. 24, 2021, provisional application No. 63/281,847, (Continued)

(51) Int. Cl.
*H04L 1/00* (2006.01)
*H04L 1/20* (2006.01)
(Continued)

(52) U.S. Cl.
CPC ........... *H04L 1/0026* (2013.01); *H04B 17/17* (2015.01); *H04B 17/18* (2015.01); *H04B 17/29* (2015.01);
(Continued)

(58) Field of Classification Search
CPC ..... H04L 1/0003; H04L 1/206; H04L 1/0015; H04L 1/0061; H04L 1/08; H04L 5/0053; H04L 43/0829; H04W 76/18
See application file for complete search history.

(56) References Cited

U.S. PATENT DOCUMENTS

2007/0089036 A1 4/2007 Jiang
2007/0089037 A1 4/2007 Jiang
(Continued)

*Primary Examiner* — Jianye Wu
(74) *Attorney, Agent, or Firm* — Mayer & Williams PC

(57) ABSTRACT

Disclosed are procedures for measuring the modulation quality of each message resource element in a failed 5G or 6G communication, thereby revealing the most likely fault locations in the message. The types of modulation deviations in the low-quality message elements can provide further guidance as to the correct demodulation. In addition, after receiving a second copy, the copies can be merged by selecting the highest quality message elements from each version, where the quality is related to how far each message element's modulation deviates from the calibrated "states" of the modulation scheme. The receiver may also determine directional information based on the modulation of each message element, and may compare versions to determine the most likely correct state of each message element. Such strategies may directly recover the original message, or may greatly reduce the number of variations that need to be tested. When implemented, fault mitigation as disclosed herein can resolve message failures, improve communication reliability, reduce latency, and improve network operations overall, according to some embodiments.

4 Claims, 11 Drawing Sheets

Related U.S. Application Data filed on Nov. 22, 2021, provisional application No. 63/281,187, filed on Nov. 19, 2021, provisional application No. 63/280,281, filed on Nov. 17, 2021, provisional application No. 63/230,926, filed on Aug. 9, 2021, provisional application No. 63/159,238, filed on Mar. 10, 2021, provisional application No. 63/159,195, filed on Mar. 10, 2021, provisional application No. 63/157,090, filed on Mar. 5, 2021, provisional application No. 63/151,270, filed on Feb. 19, 2021.

(51) Int. Cl.
| | | |
|---|---|---|
| H04B 17/17 | (2015.01) | |
| H04B 17/18 | (2015.01) | |
| H04B 17/29 | (2015.01) | |
| H04B 17/336 | (2015.01) | |
| H04W 76/00 | (2018.01) | |
| H04L 1/18 | (2006.01) | |
| H04L 5/08 | (2006.01) | |
| H04L 43/0829 | (2022.01) | |
| H04W 76/18 | (2018.01) | |
| H04L 1/08 | (2006.01) | |
| H04L 5/00 | (2006.01) | |

(52) U.S. Cl.
CPC ......... *H04B 17/336* (2015.01); *H04L 1/0003* (2013.01); *H04L 1/0015* (2013.01); *H04L 1/0061* (2013.01); *H04L 1/08* (2013.01); *H04L 1/206* (2013.01); *H04L 5/0053* (2013.01); *H04W 76/18* (2018.02); *H04L 43/0829* (2013.01)

(56) References Cited

U.S. PATENT DOCUMENTS

| | | |
|---|---|---|
| 2009/0046771 A1 | 2/2009 | Abe |
| 2010/0097939 A1 | 4/2010 | Yoneta |
| 2012/0311409 A1 | 12/2012 | Pedersen |
| 2013/0163656 A1 | 6/2013 | Sakamoto |
| 2013/0346826 A1 | 12/2013 | Zopf |
| 2014/0376358 A1 | 12/2014 | Eder |
| 2015/0139350 A1 | 5/2015 | Sugihara |
| 2016/0080109 A1 | 3/2016 | Lee |
| 2017/0019210 A1 | 1/2017 | Yu |
| 2017/0134193 A1 | 5/2017 | Sugihara |
| 2017/0288912 A1 | 10/2017 | Rahmati |
| 2017/0311300 A1 | 10/2017 | Stanwood |
| 2017/0331734 A1 | 11/2017 | Cariou |
| 2020/0366409 A1 | 11/2020 | Xu |
| 2020/0394090 A1 | 12/2020 | Urban |
| 2021/0250049 A1 | 8/2021 | Gabrys |
| 2021/0273651 A1 | 9/2021 | Haftbaradaran |
| 2021/0328598 A1 | 10/2021 | Annamraju |
| 2021/0383207 A1 | 12/2021 | Beery |
| 2022/0075968 A1* | 3/2022 | Sithamparanathan ...................... G06K 7/10297 |

* cited by examiner

ERROR CORRECTION BY MERGING COPIES OF 5G/6G MESSAGES

PRIORITY CLAIMS AND RELATED APPLICATIONS

This application claims the benefit of U.S. Provisional Patent Application Ser. No. 63/151,270, entitled "Wireless Modulation for Mitigation of Noise and Interference", filed Feb. 19, 2021, and U.S. Provisional Patent Application Ser. No. 63/157,090, entitled "Asymmetric Modulation for High-Reliability 5G Communications", filed Mar. 5, 2021, and U.S. Provisional Patent Application Ser. No. 63/159,195, entitled "Asymmetric Modulation for High-Reliability 5G Communications", filed Mar. 10, 2021, and U.S. Provisional Patent Application Ser. No. 63/159,238, entitled "Selecting a Modulation Table to Mitigate 5G Message Faults", filed Mar. 10, 2021, and U.S. Provisional Patent Application Ser. No. 63/230,926, entitled "Error Detection and Correction in 5G by Modulation Quality", filed Aug. 9, 2021, and U.S. Provisional Patent Application Ser. No. 63/280,281, entitled "Error Detection and Correction in 5G by Modulation Quality in 5G/6G", filed Nov. 17, 2021, and U.S. Provisional Patent Application Ser. No. 63/281,187, entitled "Error Correction by Merging Copies of 5G/6G Messages", filed Nov. 19, 2021, and U.S. Provisional Patent Application Ser. No. 63/281,847, entitled "Retransmission of Selected Message Portions in 5G/6G", filed Nov. 22, 2021, and U.S. Provisional Patent Application Ser. No. 63/282,770, entitled "AI-Based Error Detection and Correction in 5G/6G Messaging", filed Nov. 24, 2021, all of which are hereby incorporated by reference in their entireties.

FIELD OF THE INVENTION

The disclosure includes means for detecting and correcting wireless message errors by merging multiple transmitted copies of the message.

BACKGROUND OF THE INVENTION

Transmission faults are inevitable in wireless communication, due to noise, interference, attenuation, and other distortions. In 5G and 6G, faulted messages are detected according to an error-detection code in the message. Faulted messages may lead to retransmission requests and other delays. What is needed is means for determining which resource elements of a message are faulted, and means for repairing those faults.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a wireless receiver comprising non-transitory computer-readable media, the media comprising instructions that when executed by a computing environment cause a method to be performed, the method comprising: receiving a first wireless message comprising a first plurality of message elements, each message element of the first plurality modulated according to a modulation scheme, the modulation scheme comprising one or more amplitude levels and one or more phase levels and one or more states, each state being modulated according to one of the amplitude levels and one of the phase levels respectively; determining that the first wireless message is corrupted; receiving a second wireless message comprising a second plurality of message elements, each message element of the second plurality modulated according to the modulation scheme; determining that the second wireless message is corrupted; producing a merged message comprising a third plurality of message elements, each message element of the merged message selected from corresponding message elements of the first and second plurality according to a criterion; and determining whether the merged message is corrupted.

In another aspect, there is a receiver in a base station or a user node of a wireless network, configured to: receive a first message and a second message; determine a modulation quality of each message element of the first and second messages; prepare a merged message by selecting, for each message element of the merged message, whichever of the corresponding message elements of the first and second messages has a higher modulation quality; and determine whether the merged message is corrupted.

In another aspect, there is a method for correcting a fault in a wireless message, comprising: receiving a first copy of the message and determining that the first copy is corrupted; then receiving a second copy of the message and determining that the second copy is corrupted; determining, for each message element of the first and second copies, a modulation quality according to a difference between a modulation of the message element and a modulation level of a modulation scheme; and preparing a merged message by selecting, for each message element of the merged message, from the corresponding message elements of the first and second copies, whichever message element has higher modulation quality.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
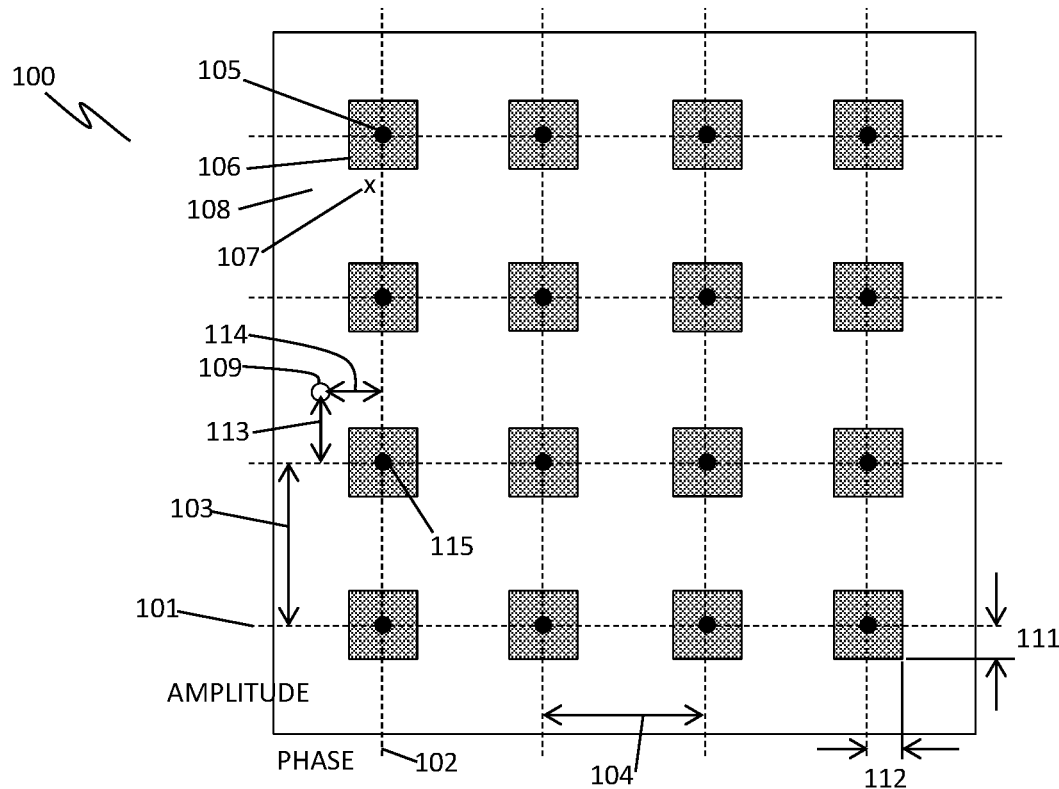
FIG. 1A is a schematic showing an exemplary embodiment of a modulation table for 16QAM, according to some embodiments.

Disclosed herein are procedures for a wireless receiver to merge two corrupted copies of a message while correcting individual errors, thereby obtaining an uncorrupted version of the message. Systems and methods disclosed herein (the "systems" and "methods", also occasionally termed "embodiments" or "arrangements", generally according to present principles) can provide urgently needed wireless communication protocols to reduce retransmission burdens, improve reliability, and reduce overall delays in networks such as 5G and 6G networks, according to some embodiments. Commonly in wireless communication, interference or noise may distort one or more message elements, resulting in a corrupted message as received. The message may then be retransmitted, and the second copy may also be corrupted. The systems and methods disclosed herein include merging the two (or more) copies of a message to eliminate the incorrectly received message elements, by evaluating a modulation quality of each message element and selecting those message elements from the two copies having the highest modulation quality. The modulation quality may be based on how well the modulation of the message element matches the calibrated amplitude and phase levels of the modulation scheme. This procedure is in contrast to prior-art "soft combining" in which message versions are merged based on the SNR (signal-to-noise ratio) of each version. Modulation quality provides a distinct, and in many cases superior, indication of which version of each message element is correct. As a further option, the receiver may determine an "overall quality factor" of each message element according to a formula that depends on both the message element's SNR and modulation quality, among other inputs. The modulation quality may be measured by the deviation of the amplitude and phase of the message element from the calibrated amplitude and phase levels of the modulation scheme, for example. The systems and methods disclosed herein can provide means for detecting one or more faulted resource elements in a message, and efficiently determining the correct value of those resource elements, thereby providing a low-latency and high-reliability solution to message fault problems, according to some embodiments.

Terms used herein generally follow 3GPP (Third Generation Partnership Project) usage, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. "Receiver" is to be interpreted broadly, including processors accessible by the recipient and configured to perform calculations on received signals or messages. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. "RNTI" (radio network temporary identity) or "C-RNTI" (cell radio network temporary identification) is a network-assigned user code. "QoS" is quality of service, or priority. "QCI" (QoS class identifier) defines various performance levels. "SNR" (signal-to-noise ratio) and "SINR" (signal-to-interference-and-noise ratio) are treated equivalently herein.

In addition, the following terms are defined herein. Each modulated resource element of a message is referred to as a "symbol" in references, but this may be confused with the same term for a time interval. Therefore, each modulated resource element of a message is referred to as a "message resource element" or a "message element" in examples below. A "demodulation reference" is a set of modulated resource elements that exhibit levels of a modulation scheme (as opposed to conveying data), and each resource element of a demodulation reference is termed a "reference element" herein. A message may be configured "time-spanning" by occupying sequential symbols at a single frequency, or "frequency-spanning" on multiple subcarriers at a single symbol time (also called "frequency-first" if the message continues on multiple symbol times). In contrast, messages may be TDD (time-division duplexing) when the two messages are transmitted at different times, or FDD (frequency-division duplexing) if the two messages are transmitted on different frequencies. An "EDC" (error-detecting code) is a field in a message configured to detect faults, such as a "CRC" (cyclic redundancy code) or a parity construct or the like. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message have been changed relative to the original message. "Receptivity" is the quality of reception of a message. Modulation schemes include "BPSK" (binary phase-shift keying) and "QPSK" (quad phase-shift keying) which have phase modulation only, and "16QAM" (quadrature amplitude modulation with 16 states) which has both phase and amplitude modulation and carries 4 bits per message element. A "modulation scheme" is one or more predetermined amplitude levels and one or more predetermined phase levels, which together define an array of "predetermined modulation states of the modulation scheme" or more simply "states", each state representing a resource element modulated according to one of the amplitude levels and one of the phase levels. The "amplitude deviation" of a message element is the difference between its amplitude and the closest amplitude level of the modulation scheme, and likewise the "phase deviation" of a message element is the difference between its phase and the closest phase level of the modulation scheme. The "modulation quality" is a measure of how close the modulation of a message element is to the closest amplitude and phase levels of the modulation scheme, or equivalently how close the modulation of the message element is to the closest state of the modulation scheme. A "calibration set" is a set of amplitude and phase levels of the modulation scheme, as provided by a demodulation reference, for example. A message can be demodulated by comparing each message element's amplitude and phase to the levels in the calibration set, and thereby determining the modulation state of the message element.

If one or more elements of a "subject" message have been distorted by noise or interference when received, the message fails the "EDC test", that is, the embedded error-detection code disagrees with the bit-level content of the message. The fault may have occurred during the modulation step in the transmitter, or in propagation through the air, or at the receiver side, and may be due to electronic noise or external interference or atmospheric absorption or scattering or reflection of the electromagnetic wave, to name just a few possible sources of message faults. Amplitude or phase distortion can cause the receiver to incorrectly demodulate one or more message elements, in which case the message fails the EDC test. Upon detecting a faulted message, the recipient in 5G or 6G can do one of several things. If the recipient knows that the message is intended for it, such as a base station that has scheduled an uplink message at a particular time or a user device with a scheduled downlink message, the recipient can request a retransmission upon detecting the faulted transmission. For most downlink control messages, however, the user device does not know the time or frequency or length of a message, or even if the message is intended for that user device, because the downlink in 5G/6G generally relies on a "blind search" for user devices to locate their control messages, and a faulted message would appear as something not intended for that user device. Therefore, user devices can request a retransmission after failing to receive an expected message after a certain amount of time. In addition, the base station can retransmit the message after failing to receive an acknowledgement in a certain time, among other options. In each case, substantial information is discarded, and repeated retransmissions may be required in noisy conditions to finally obtain an uncorrupted version.

In contrast, the disclosed systems and methods show how a receiver can merge two faulted copies of a message and process them to recover the original message. Merging a message with a retransmitted copy, while arranging to select the most likely correct version of each message element, may save time and enhance network reliability, among other benefits, according to some embodiments. The original and retransmitted versions generally differ in one or more message elements, which may be termed the "multi-valued" message elements. The receiver can determine a "modulation quality" of each multi-valued element by measuring their amplitude and phase, then comparing to the calibrated amplitude and phase values of the modulation scheme (as obtained from a demodulation reference for example). The modulation quality is thereby calculated according to how far the amplitude and phase of the message element deviate from the calibrated amplitude and phase levels of the closest state of the modulation scheme. Then, the receiver can merge the two copies by selecting each message element from the two versions, with the highest modulation quality for each multi-valued element. Alternatively, the receiver can merge the messages based on a combination of the modulation quality and the SNR of the multi-valued elements. In either case, the merged version is likely to have fewer faults than either of the as-received message versions.

If the merged version, with elements selected according to modulation quality (optionally including SNR), still fails the error-detection test, the receiver can search for the correct version by altering one or more of the multi-valued message elements. More specifically, the receiver can change which state, of the modulation scheme states, the message element is assigned to, and and can then determine whether the message so altered then agrees with the error-detection code. Starting with the merged message having each multi-valued element set at the value with the higher modulation quality, the receiver can then alter each of the multi-valued message elements one-at-a-time to the opposite value. If none of those alterations passes the error-detection test, the receiver can then alter all of the multi-valued elements in all combinations, testing each combination against the error-detection code. Further variations and options are detailed below.

The following examples disclose how the modulation quality of each message element can be determined.

FIG. 1A is a schematic showing an exemplary embodiment of a modulation table, according to some embodiments. A modulation table represents the states of a modulation scheme as an array according to the amplitude and phase of each modulation state. As depicted in this non-limiting example of a modulation table 100, four amplitude levels 101 are shown as dotted horizontal lines, and four phase levels 102 are shown as dotted vertical lines. Each state 105 is a modulation of a resource element, modulated according to one of the amplitude levels 101 and one of the phase levels 102, as indicated by a dot 105. The amplitude levels 101 are spaced apart by an amplitude step 103, and the phase levels 102 are spaced apart by a phase step 104. As used herein, two states are "adjacent" when they are separated from each other by one amplitude level or one phase level, or both. Phase is a circular parameter, since zero degrees is the same as 360 degrees. Hence, the highest and lowest phase levels are separated by one phase step 104, although that may not be obvious in this type of chart.

The modulation scheme in the depicted case is 16QAM, with four amplitude levels 102 and four phase levels 103 and sixteen states 105 indicated by dots. Around each state 105 is a rectangle in dark stipple representing a "good-modulation zone" 106 (or "good-mod" in figures). Each rectangular good-modulation zone 106 is defined by the associated amplitude level 101 plus or minus an amplitude range 111, and by the associated phase level 102 plus or minus a phase range 112. A message element that is modulated in amplitude and phase anywhere within a good-modulation zone 106 is assigned to the associated state 105, for purposes of demodulation. The exterior white space 108 is a "bad-modulation zone" (or "bad-mod"). Any message element modulated in the bad-modulation zone 108 is flagged as invalid or illegal, although it may be assigned to the nearest state of the modulation scheme anyway.

For example, the figure shows two message elements, marked as a small "x" 107 and a small "o" 106, both in the bad-modulation zone 108. Although the phase modulation of the message element "x" 107 is within the phase range 112 of one of the phase levels 102 of the modulation scheme, the amplitude modulation is not within the amplitude range 111 of any of the amplitude levels 101, and therefore the message element "x" 107 may be declared bad-modulation or low modulation quality. Similarly, the figure shows another message element's modulation state as an "o" 109, which has an amplitude deviation 113 relative to the nearest amplitude level 101 as indicated, and a phase deviation 114 relative to the nearest phase level 102. The amplitude deviation 113 for this message element 109 is greater than the amplitude range 111 required for good modulation. The phase deviation 114 is also greater than the phase range 112. Hence, the message element "o" 109 may be flagged as "illegal" or "bad-mod" or at least "suspicious" in various embodiments, as described below. The "x" 107 and "o" 106 may be initially assigned to the nearest modulation state, 105 and 115 respectively, however their assignments may be altered later if the message fails to agree with its error-correction code.

While the figure shows the 16QAM modulation scheme, many other modulation schemes are possible. For example, 64QAM and 256QAM involve additional phase and amplitude levels, whereas QPSK has four phase levels and only a single amplitude level. The "difference" between a modulated message element 109 and a state 105 includes a difference in phase for QPSK, or a difference in phase and amplitude for the QAM modulation schemes. In each case, the methods disclosed herein for 16QAM can be applied straightforwardly to each modulation scheme, according to some embodiments.

The figure, and the other examples to follow, are presented according to a standard modulation scheme in which the amplitude and phase are modulated separately and then multiplexed. The receiver demodulates a message by determining the amplitude and phase of each message element separately, and compares them to the amplitude and phase levels recorded in the calibration set. In other embodiments, however, the message may employ pulse-amplitude modulation (PAM), in which two amplitude-modulated signals are added with a 90-degree phase offset between them. Upon receipt, the demodulator then picks out the "real" (zero offset) and "imaginary" (90-degree offset) signals for each of the reference elements and message elements. The two phase modulations are also sometimes called the "I" or in-phase component and the "Q" or quadrature component. The receiver then prepares a "constellation" of modulation states from the measured real and imaginary values of the reference elements, each state having a particular real amplitude and a particular imaginary amplitude. The receiver then demodulates the message elements by comparing their real and imaginary values to the real and imaginary levels of the constellation, and thereby determines the modulation state of each message element, as desired. For example, 16QAM with PAM modulation has four real amplitudes and four imaginary amplitudes, which are combined in each message element to yield 16 states overall. The constellation of PAM is equivalent to the calibration set of regular amplitude-phase modulation. The systems and methods disclosed herein are straightforwardly applicable to the real-imaginary modulation states of PAM. Many other modulation technologies and schemes exist. As long as the modulation scheme involves modulating the phase and (optionally) the amplitude of an electromagnetic wave, it is immaterial which modulation technology is employed. For consistency and clarity, the examples refer to regular amplitude and phase modulation separately. The principles disclosed herein may apply to each of these modulation technologies, as will be apparent to artisans with ordinary skill in the art after reading the present disclosure.

Figure 1B:
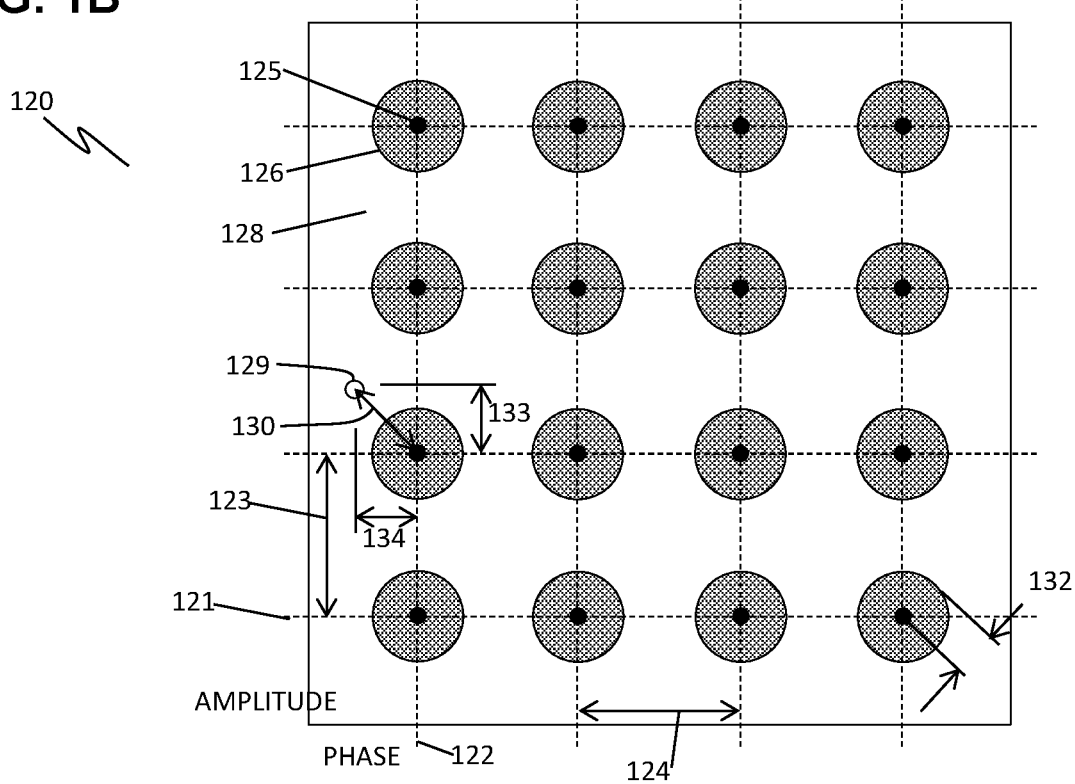
FIG. 1B is a schematic showing another exemplary embodiment of a modulation table for 16QAM, according to some embodiments.

FIG. 1B is a schematic showing another exemplary embodiment of a modulation table for 16QAM, according to some embodiments. As depicted in this non-limiting example, the modulation table 120 may include four amplitude levels 121 separated by an amplitude step 123, and four phase levels 122 separated by a phase step 124, for sixteen states 125 total. Each state 125 is surrounded in this case by a circular good-modulation zone 126, each with a radius 132 as indicated. The exterior white space 128 represents bad-modulation. A particular message element "o" 129 has an amplitude deviation 133 and a phase deviation 134, and is at a distance 130 (that is, distance in phase-amplitude space) from the nearest state 125. If that distance 130 is less than the radius 132 of the good modulation zone, the message element 129 is assigned to the nearest state 125 and is allocated to "good-modulation". If the distance 130 is greater than the radius 132, then the message element 129 may still be assigned to the nearest state 125, but may be flagged as suspicious or "bad-modulation" for later mitigation, if needed.

The units and dimensions of phase are generally different from those for amplitude, which may complicate calculating the distance 130. Therefore, for ease of calculation, the measurements may be made unitless by calculating a "normalized" amplitude and phase deviation. The normalized amplitude deviation equals the measured amplitude of a message element divided by the amplitude step, and the normalized phase deviation equals the measured phase of the message element divided by the phase step 124. Then the distance of a received message element from the closest state of the modulation scheme equals the square root of the sum of the normalized amplitude deviation squared, plus the normalized phase deviation squared. In some embodiments, the modulation quality is determined by the distance thus determined, as opposed to the amplitude and phase deviations separately. For example, a larger distance to the nearest state of the modulation scheme may correspond to a lower modulation quality.

Figure 2:
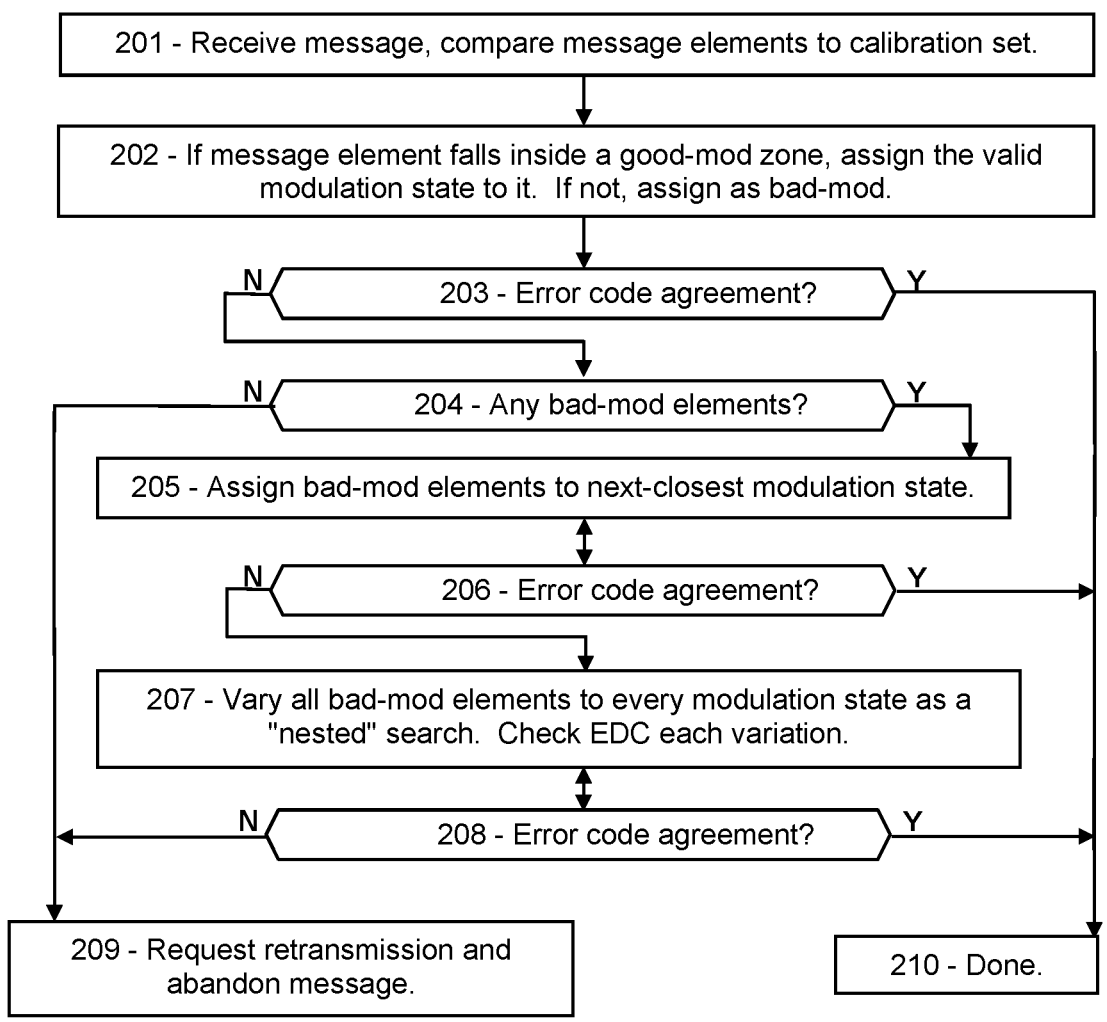
FIG. 2 is a flowchart showing an exemplary embodiment of a process for detecting and correcting message errors, according to some embodiments.

FIG. 2 is a flowchart showing an exemplary embodiment of a process for detecting and correcting message errors, according to some embodiments. As depicted in this non-limiting example, a receiver may receive a message at 201 and compare each message element to a calibration set representing the amplitude levels and phase levels of the modulation scheme. At 202, the receiver may assign each message element to the closest state of the modulation scheme, that is, to the state corresponding to the closest amplitude level and the closest phase level to the received message element. In addition, the receiver may allocate each message element to a category based on the modulation quality, such as good-mod if the message element is inside one of the good-modulation zones, and bad-mod if it is outside all of the good-modulation zones. In addition, the receiver can calculate a numerical modulation quality based on the amplitude and phase deviations. Then the message can be tentatively demodulated by assigning each message element to the closest state of the modulation scheme.

At 203, the receiver can compare the demodulated message to an error-detection code, and if there is agreement, the message is assumed to be correctly demodulated, and the task is done at 210. If the message fails the error detection code, then at 204 the receiver can determine whether the message includes any bad-modulation message elements. At 205, for each bad-modulation element, the receiver can attempt to fix the fault and recover the message by altering the bad-mod element to the next-closest state instead of the closest one. (The next-closest state is the state that is closer to the message element's modulation than any other state of the modulation scheme, other than the closest one.) At 206, the altered message is tested against the error-detection code for each alteration, and if there is agreement, the task is done. If not, the receiver may continue altering any remaining bad-mod elements to their next-closest state, one at at time, and test again. After testing each one of the bad-mod elements individually in this way, the receiver can then alter two of the bad-mod elements at a time, and may continue by altering multiple elements elements in combination, altering each one between its nearest and next-nearest states of the modulation scheme. The receiver can continue varying the bad-mod elements until all possible combinations of the bad-mod elements have been altered to their next-closest state of the modulation scheme, and can test each altered message against the error-detection code. This process is a loop, cycling through steps 205 and 206 repeatedly until all combinations have been tested. For clarity, however, the steps are shown simply as a command 205 and an interrogator 206 in the figure. A double-ended arrow between the command 205 and the interrogator 206 indicates that the two steps are to be performed repeatedly until all the associated variations have all been tested, and aborting the loop if any of the variations passes the EDC test.

If the message fails the error-detection test for all of the alterations of the bad-mod elements to their closest and next-closest states, the flow proceeds to 207 for a more exhaustive search. Here each of the bad-mod message elements is again altered sequentially, but now they are varied to all of the states of the modulation scheme, instead of being restricted to just the closest and the next-closest states. Each of the bad-mod message elements can be tested sequentially at each of the states, while all of the other bad-mod message elements are also altered in turn. Such a grid search, in which two or more items are independently varied among multiple settings, and all possible combinations are tested, may be termed a "nested" search. For example, if there are B bad-mod message elements and the modulation scheme has S states, the number of combinations is $S^B$ separate tests. If any of those tests results in agreement with the error-detection code at 208, the task is done at 210. If none of the tests is in agreement, at 209 a retransmission is requested. The current message is then abandoned, or, in another embodiment, the message may be retained for analysis when the retransmitted version is received.

In some cases, the bad-modulation message element may happen to be one of the resource elements in the error-detection code. In that case, the bad-modulation element may be altered and tested in the same way as any other element of the message. Then, in determining whether the altered message is corrupted, the receiver uses the altered error-detection code to compare with the bit-level content of the rest of the message. Thus a fault in the error-detection code may be mitigated in the same way as a fault elsewhere in the message.

In some embodiments, the receiver may determine which message elements to alter according to the distance, in phase-amplitude space, of each message element's modulation relative to the nearest state of the modulation scheme. In that case, since the determination is based on a distance value, there may be no need for the good-marginal-bad categorization.

In some embodiments, the receiver may calculate an overall quality parameter of each message element according to the SNR in that message element's signal, and the modulation quality as measured by the deviation of the amplitude and/or phase from the nearest state of the modulation scheme. By combining the SNR measurement with the modulation quality determination, the receiver may mitigate certain types of noise and interference. For example, the receiver may determine which message elements to alter according to an algorithm that takes, as input, the SNR and the modulation quality, and provides, as output, the overall quality parameter.

Figure 3A:
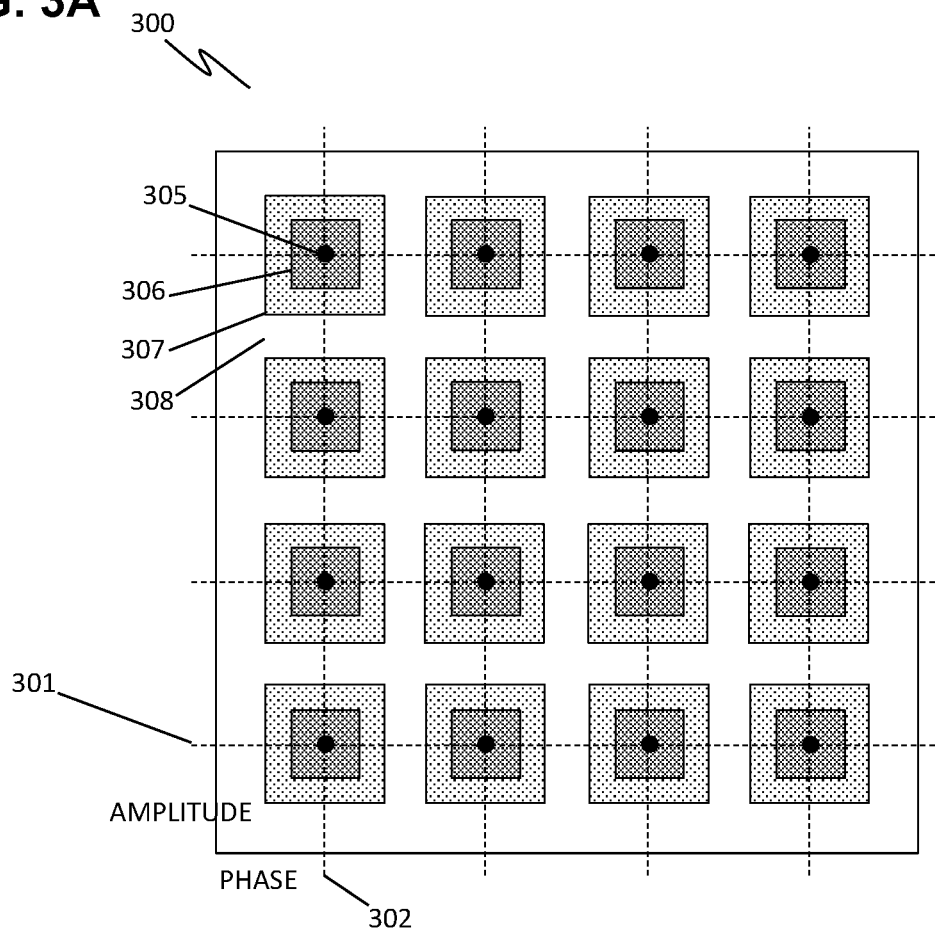
FIG. 3A is a schematic sketch showing an exemplary embodiment of a modulation table with multiple levels of modulation quality, according to some embodiments.

FIG. 3A is a schematic sketch showing an exemplary embodiment of a modulation table with multiple levels or categories of modulation quality, according to some embodiments. As depicted in this non-limiting example, a modulation table 300 (for 16QAM in this case) includes four amplitude levels 301, four phase levels 302, which together define sixteen states 305. Around each state 305 is a good-modulation zone 306 in dark stipple, surrounded by a marginal-modulation (that is, marginal quality modulation) zone 307 in light stipple, and the remaining white space 308 is a bad-modulation zone. A message element with amplitude and phase modulation that falls in one of the good-modulation zones 306 may be assigned to the associated state 305 of the modulation scheme. A message element with modulation falling in the marginal-modulation zone 307 may also be assigned to the associated state 305, but with a flag indicating that it is suspicious due to its lower quality of fit to the states. A message element with modulation falling in the bad-modulation zone 308 may also be assigned to the nearest state 305, but with a flag indicating that it is very suspicious. Then, if the message is found to be corrupted, the bad-modulation elements may be altered first, to see whether any alterations may satisfy the EDC test, and if none of those variations succeeds in agreeing with the error-detection code, then the bad-modulation elements and the marginal-modulation elements may be varied together.

Figure 3B:
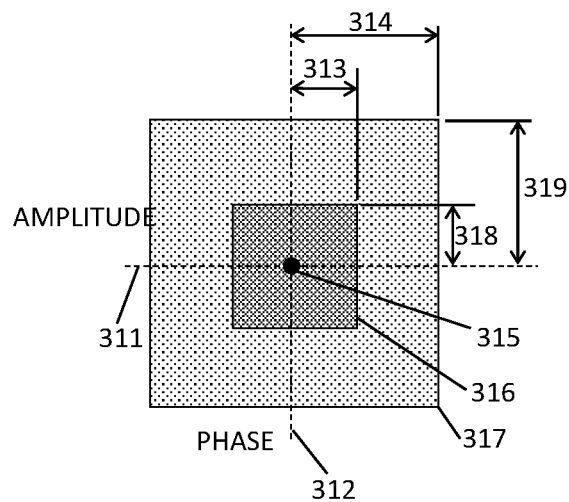
FIG. 3B is a schematic sketch showing an exemplary embodiment of a single modulation state with multiple levels of modulation quality, according to some embodiments.

FIG. 3B is a schematic sketch showing an exemplary embodiment of a single modulation state with multiple levels of modulation quality, according to some embodiments. As depicted in this non-limiting example, a modulation state (such as one of the modulation states of the previous figure) may be indicated as a dot 315 at the intersection of an amplitude level 311 and a phase level 312, surrounded by a good modulation zone 316, and further surrounded by a marginal modulation zone 317. The good modulation zone 316 may be a rectangular region, defined by the amplitude level 311 plus or minus the amplitude range 318, and by the phase level 312 plus or minus the phase range 316. The marginal modulation zone 317 may be a rectangular region equal to the amplitude level 311 plus or minus the amplitude range 319, and the phase level 312 plus or minus the phase range 314, exclusive of the good modulation zone 316. Message elements modulated in the good modulation zone 316 may be assigned the state 315 with high probability. Message elements modulated in the marginal modulation zone 317 may also be assigned the state 315, but flagged as suspicious. Message elements modulated exterior to the marginal modulation zone 317 may also be assigned the state 315 if that is the closest one, but may be flagged as bad-modulation for the purposes of mitigating faults.

Figure 3C:
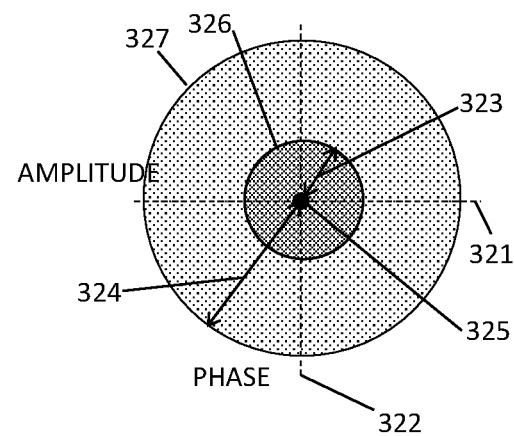
FIG. 3C is a schematic sketch showing another exemplary embodiment of a single modulation state with multiple levels of modulation quality, according to some embodiments.

FIG. 3C is a schematic sketch showing another exemplary embodiment of a single modulation state with multiple levels of modulation quality, according to some embodiments. As depicted in this non-limiting example, a single valid modulation state 325 at the intersection of an amplitude level 321 and a phase level 322 may be surrounded by a round region of good-modulation 326 which may be surrounded by an annular marginal-modulation region 327. The radius 323 of the good-modulation region 326 is shown, and the outer radius 324 of the marginal-modulation region 327 is shown. Thus a message element may be allocated to the good-modulation category if the amplitude and phase modulation of the element are such that the modulation falls in the good-modulation zone 326, and likewise for the marginal-modulation zone 327. For example, the "distance" of the message element from the state 325 may be calculated as the square root of the amplitude deviation squared plus the phase deviation squared, and if this distance is less than the good modulation radius 323 the message element is allocated good-modulation quality. If the distance is greater than the good-modulation radius 323 but less than the marginal-modulation radius 324, the message element may be allocated marginal-modulation quality. If the distance is greater than the marginal-modulation radius 324, the message element may be allocated bad-modulation quality.

Figure 4:
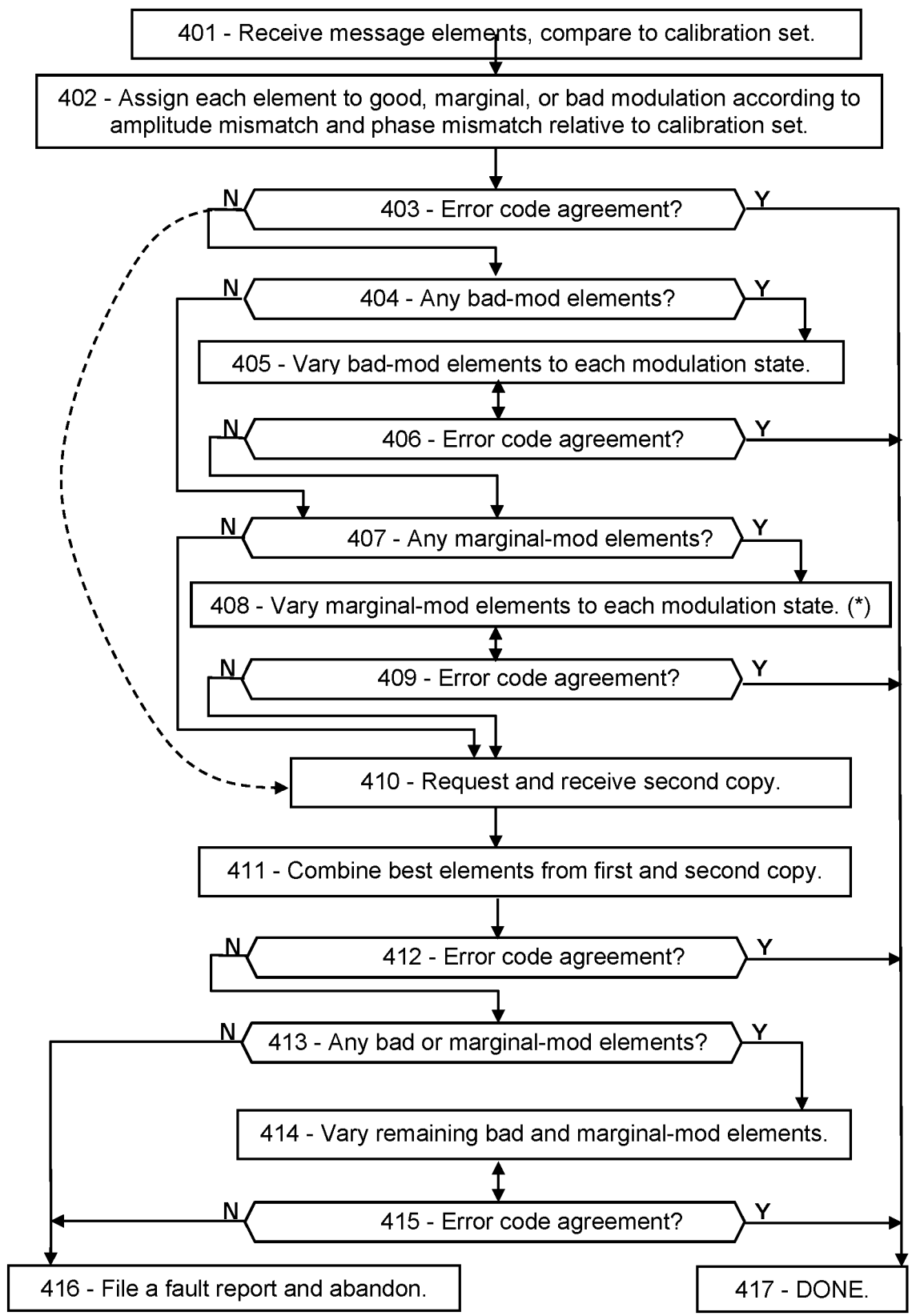
FIG. 4 is a flowchart showing an exemplary embodiment of a process for detecting and correcting message errors using multiple levels of modulation quality, according to some embodiments.

FIG. 4 is a flowchart showing an exemplary embodiment of a process for detecting and correcting message errors using multiple levels or categories of modulation quality, according to some embodiments. As depicted in this non-limiting example, at 401 a receiver receives a message and compares each message element to the amplitude and phase levels previously provided in a calibration set. The calibration set includes the amplitude and phase levels of the modulation scheme, as provided by a demodulation reference, for example. At 402, the receiver assigns each message element to the closest state of the modulation scheme, and also allocates a modulation quality as good, marginal, or bad depending on the distance, in amplitude and phase, of the message modulation to the nearest state. After attempting to demodulate the message elements, the receiver compares the message to an error-detection code at 403. If the message agrees with the error-detection code, the task is done at 417. If not, the receiver checks at 404 whether the message contains any bad-modulation elements, and drops to 407 if not. If the message has at least one bad-modulation element, at 405 the receiver varies the bad-modulation elements among all of the states of the modulation scheme in a nested grid search, as indicated by a double arrow. For example, the receiver may alter the first bad-modulation element successively to each state, while keeping the other bad-modulation elements assigned to their closest states, and may test each variation against the error-detection code. The receiver may perform a similar scan using the second bad-modulation element while keeping all the others at their closest state values, and may continue such a single-element variation until all of the bad-modulation elements have been explored individually. Then, if no match has been found, the receiver may vary two of the bad-modulation elements across all of the states, testing each combination of two states at a time, and then proceeding in a similar way through all pairs of bad-modulation elements. Then, if no match has been found, the receiver may vary the bad-modulation elements three-at-a-time, exhaustively covering the states, and testing the error-detection code on each one. The receiver may continue this nested search until all combinations of bad-modulation elements and all states have been tested. If any one of those variations satisfies the error-detection code, the message is demodulated and the task is done at 417. If not, the flow proceeds to 407.

At 407, the receiver determines whether the message has any marginal-modulation elements, and if so, it varies the marginal-modulation elements and the bad-modulation elements together in a nested search at 408, as indicated by a double arrow. (The asterisk is explained later.) For example, the receiver can vary the bad and marginal-modulation elements in an exhaustive grid search covering all combinations of the states for each message element, and may test the error-detection code for each variation at 409. (The good-modulation message elements are generally left at their original nearest-state values.) If any of those variations agrees with the error-detection code, the task is done. If not, or if there are no marginal-modulation elements, the receiver may request and receive a second copy of the message at 410, and may merge the first and second copies by selecting the best quality modulation states for each element at 411, and may test that merged version against the error-detection code at 412, as described in more detail below.

Then, at 413, the receiver may determine whether the merged message still includes any bad-modulation or marginal-modulation elements. If the merged message includes only good-modulation elements, yet still fails the EDC test, then the receiver may abandon the message at 416 and optionally file a fault report. However, if the merged message has one or more bad-modulation or marginal-modulation elements at 414, the receiver may vary those in another nested search as described. If one of those variations agrees with the error-detection code at 415, the task is done. If not, the receiver may abandon at 416.

In some embodiments, the retransmitted message message may have one or more "paradoxical" message elements. A paradoxical message element is modulated in the good-modulation zone of one state in the first message, and is modulated in the good-modulation zone of a different state in the retransmitted message. That is, the message element appears to be correctly modulated in both message versions, but in different states. This can happen if the noise and interference have caused the distorted phase and amplitude of one or both of the versions to arrive, by chance, in another good-modulation zone. In that case, the receiver can flag all paradoxical message elements as suspicious, and can test both versions alter their state assignments in the same way as the bad-modulation elements.

In some embodiments, the receiver may determine the modulation quality as a calculated value, instead of the good-marginal-bad categories. The receiver can then vary the remaining suspicious elements according to the modulation quality value, starting with the message element that has the lowest modulation quality. The receiver can then proceed to vary and test the second-lowest modulation quality message element, and so forth until the error-detection code matches.

In some embodiments, the amount of time required to perform the searches of 406 to 409 may exceed the amount of time to request and receive a second copy of the message, in which case the receiver may request the second copy as soon as the initial version fails the error-detection code. This option, of jumping to 410 upon determining that the initial message fails the test and has too many suspicious elements for an alteration scan, is indicated by a dashed arrow. For example, the receiver may already know how much time would be required to test all combinations of the suspicious message elements. The receiver may use an algorithm, for example, to determine the probable time involved, and if the probable time exceeds the normal retransmission time, the receiver can request a retransmission. While waiting for a retransmission, however, the receiver may continue to test variations of the message, in case one of the variations succeeds before the retransmitted message arrives.

In some embodiments, the variations of the marginal modulation message elements at 408 may be done in two stages for improved efficiency, as indicated by an asterisk (*). Some types of noise and interference cause only small changes in the phase and amplitude of message elements, and therefore each message element with marginal modulation is often shifted by just one amplitude or phase level due to noise. Therefore, when altering the state assignments of the marginal-mod elements, the correct state is likely to be adjacent to the originally assigned state. Therefore, the receiver may alter each of the marginal-modulation message elements according to its eight adjacent states (or five adjacent states if the original state is already at the maximum or minimum amplitude) and may test those nearest-neighbor variations first, since they are the most likely candidates for repairing the message. As mentioned, the alteration of the marginal-modulation elements may be done in a nested grid search, to cover all of the possible alterations of the suspicious message elements to their adjacent states. If none of those near-neighbor alterations passes the EDC test, then the receiver may then vary the message elements across the entire set of states of the modulation scheme (skipping the versions that have already been checked). The receiver may save time by testing the most likely combinations first, based on the modulation quality for example.

The systems and methods disclosed herein further include directional sectors around each valid modulation state. The following examples show how a faulted message may be recovered using that direction information, according to some embodiments.

Figure 5A:
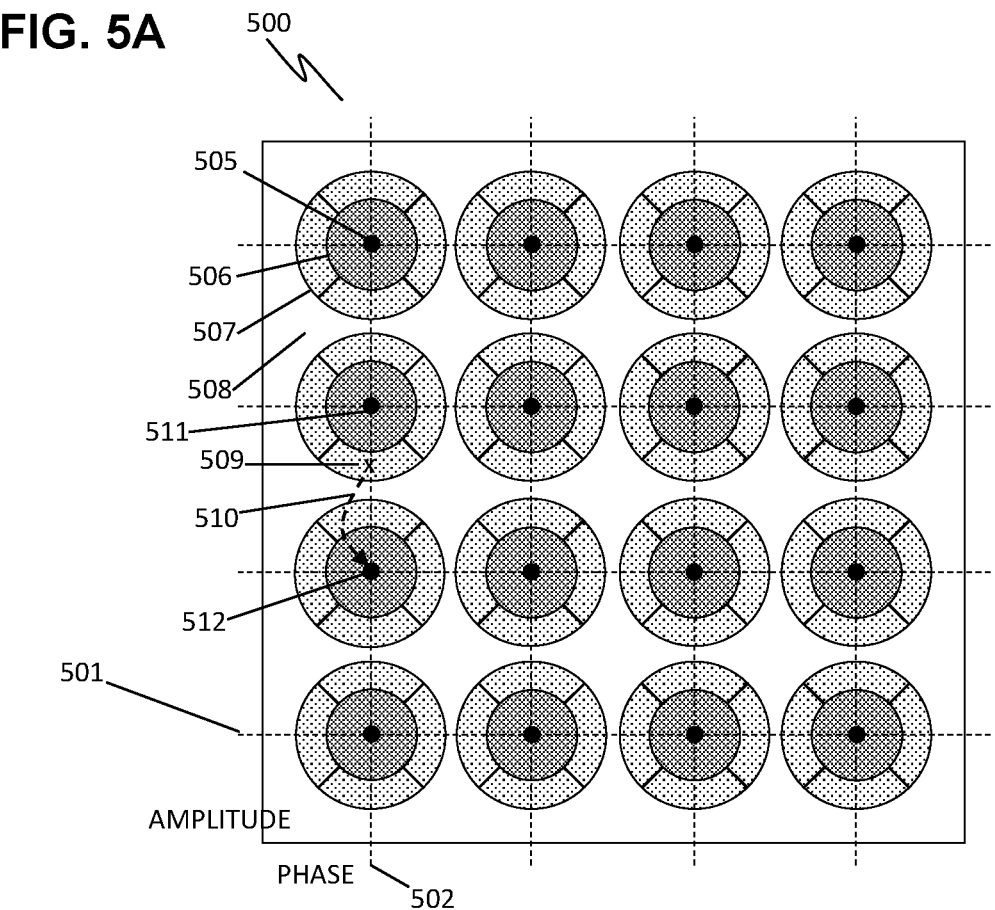
FIG. 5A is a schematic sketch showing an exemplary embodiment of a modulation table for 16QAM with directional deviation sectors, according to some embodiments.

FIG. 5A is a schematic sketch showing an exemplary embodiment of a modulation table for 16QAM with directional deviation sectors, according to some embodiments. As depicted in this non-limiting example, a modulation table 500 with amplitude levels 501 and phase levels 502 define states 505, which are surrounded by a good-modulation zone 506 and a marginal-modulation zone 507 within white space bad-modulation area 508. The marginal-modulation zones 507 are divided into multiple sectors, as explained in more detail in the next figure.

The sectors may assist the receiver in recovering a faulted message. For example, if a message fails the EDC test, the receiver may look for a particular message element modulated in a marginal-modulation zone 507, such as the "x" 509. The "x" is initially assigned to the closest state, which is the state 511. Since the message with that assignment fails the error-detection test, the receiver may attempt to correct the message by altering the state that the "x" 509 is assigned to. Since the "x" 509 is in a sector directed toward a lower amplitude state with the same phase, which is state 512, the receiver may alter the assignment to the next-lower amplitude state, as indicated by a dashed arrow 510, and may test that message alteration against the EDC code. Since many message faults involve small changes in amplitude or phase, the receiver may advantageously alter the state assignment of marginal-modulation elements to an adjacent state in a direction indicated by the sector that the element occupies. If that alteration is successful, the receiver has thereby rescued the message and saved substantial time. If it fails, the receiver can then try other nearby states, or can alter to the remaining states of the modulation scheme. By starting with the lowest-cost and highest-probability alteration first, and then proceeding to test successively higher-cost alterations with lower probability of success, the receiver may thereby minimize the time and cost involved in searching for the correct message, avoid retransmission delays, and enhance network reliability in the presence of noise and interference.

In another embodiment, the receiver may select a message element modulated in the bad quality zone 508, determine a direction according to the difference between the message element's modulation and the nearest state of the modulation scheme, and then alter the message element's assignment to the adjacent state in the direction indicated by its modulation.

Figure 5B:
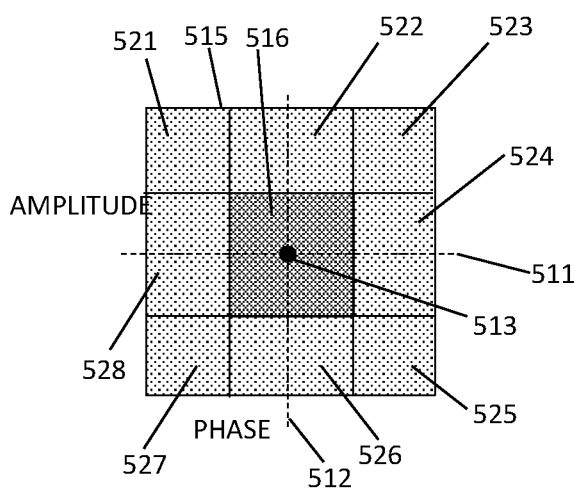
FIG. 5B is a schematic sketch showing an exemplary embodiment of a single modulation state with directional deviation sectors, according to some embodiments.

FIG. 5B is a schematic sketch showing an exemplary embodiment of a single modulation state with directional deviation sectors, according to some embodiments. As depicted in this non-limiting example, a modulation state may include a state 513 which includes multiplexed modulation at an amplitude level 511 and a phase level 512. The good-modulation zone 516 is surrounded by a marginal-modulation zone 515. The marginal-modulation zone 515 is divided into eight sectors in this case, 521, 522, 523, 524, 525, 526, 527, and 528. The sectors 521-528 may assist the receiver in determining how to modify and recover a faulted message. For example, if the message as-received fails the error-detection code and one of the message elements is modulated according to, say, sector 524, then the receiver may alter that message element to the adjacent state in a direction indicated by the occupied sector, which in this case is the next-higher phase level, and test that variation.

In a similar way, a message that fails the error-detection code and has a marginal-modulation element in sector 522 may alter that element to the same phase and the next-higher amplitude state, and may then test that variation. It may be noted that amplitude, unlike phase, does not always have an adjacent state in a specified direction. If the current modulation state 513 is already at the highest amplitude level, then the receiver cannot increase it further, and therefore may ignore the sector information if it seems to point in the direction of even higher amplitude modulation. Likewise, if the marginal modulation element falls in sector 527, the receiver may alter the message element to an adjacent state with one level lower amplitude and one level lower in phase. However, if the state is already at the lowest amplitude level, then the receiver cannot alter to the next-lower amplitude. As mentioned, phase does not have this limitation because phase is a circular parameter. For example, if the marginal-modulation element occupies sector 528 and the element is already in the lowest phase level, then the receiver can alter the element to the highest phase level, since the lowest and highest phase levels are separated by just one phase step.

The receiver may thereby use the sector information present in the marginal-modulation elements of a faulted message as a guide for varying the assignment of each message element's state of the modulation scheme. Such a guided alteration may be especially valuable in cases where the distortions are small, since in that case the near neighbors are more likely than the others to be the correct value for the faulted message element. If those initial small variations fail to agree with the error-detection code, then larger variations may be tested before abandoning the message or requesting a retransmission.

Figure 5C:
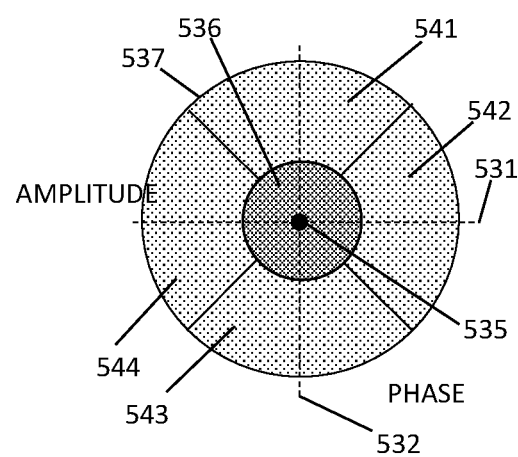
FIG. 5C is a schematic sketch showing another exemplary embodiment of a single modulation state with directional deviation sectors, according to some embodiments.

FIG. 5C is a schematic sketch showing another exemplary embodiment of a single modulation state with directional deviation sectors, according to some embodiments. As depicted in this non-limiting example, a single modulation state of a modulation scheme is indicated as 535 at the intersection of an amplitude level 531 and a phase level 532, surrounded by a good-modulation zone 536 and a marginal-modulation zone 537 which is divided into four sectors 541, 542, 543, 544. As in the previous example, the receiver may receive a faulted message containing at least one marginal-modulation element, and may attempt a recovery by altering the marginal-modulation element to an adjacent state in the direction of the sector that the message element occupies. By making the most likely alterations first, the receiver may thereby find the correct message quickly, saving time and reducing the calculation burden.

In another embodiment, instead of assigning message elements in the marginal zone to sectors, the receiver may determine a distance value and a direction value according to the amplitude and phase modulation of each message element relative to the closest state. If the message fails to agree with the error-detection code, the receiver may select one or more message elements having the largest distance value, and may alter those message elements to the nearest neighbor according to the direction value.

Figure 6:
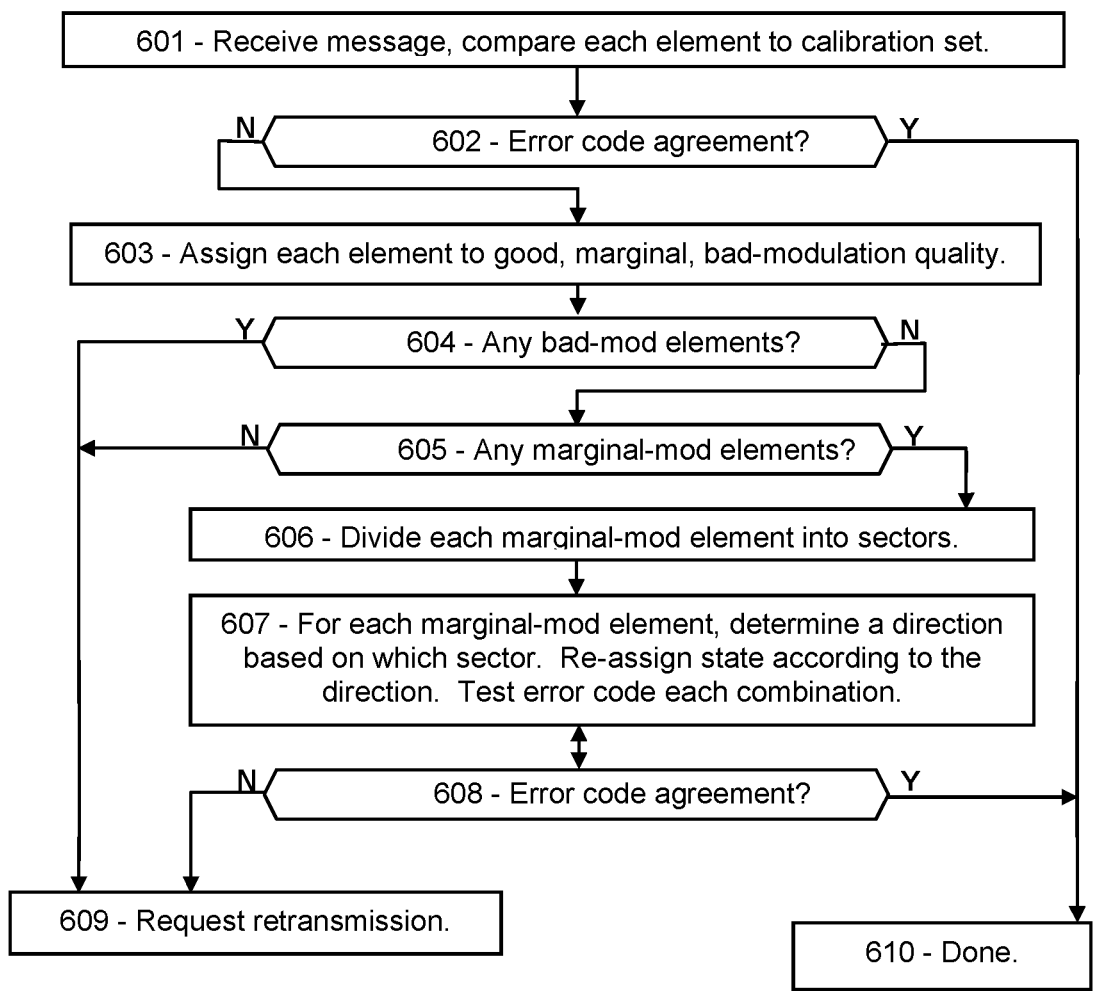
FIG. 6 is a flowchart showing an exemplary embodiment of a process for detecting and correcting message errors according to directional deviation sectors, according to some embodiments.

FIG. 6 is a flowchart showing an exemplary embodiment of a process for detecting and correcting message errors according to directional deviation sectors, according to some embodiments. As depicted in this non-limiting example, a receiver may receive a message at 601, demodulate each message element using a previously determined calibration set including the amplitude and phase levels of the modulation scheme, and then at 602 compare the message to an embedded error-detection code. If the message passes the EDC test, the task is done at 610. If not, at 603 the receiver may assign each message element to good, marginal, or bad-modulation zones according to how close the modulation of the message element is to the closest state of the modulation scheme. At 604, the receiver determines whether any of the message elements occupies the bad-modulation zone, and if so, the receiver may abandon the message at 609 and/or request a retransmission, in this example. If there are no bad-modulation elements, the receiver may determine at 605 whether there are some marginal-modulation elements, in which case the receiver may attempt to repair the message using the sector information. At 606, if not sooner, the receiver may divide each marginal-modulation zone into sectors according to position, and at 607 may determine a direction based on which sector each marginal-modulation element occupies. The receiver may then alter each marginal-modulation message element to the adjacent modulation state in the direction indicated by the occupied sector, and may test that variation against the error-detection code. If it passes at 608, the receiver has succeeded in recovering a faulted message and is done. If not, the receiver may request a retransmission and merge the message with the retransmitted copy, in some embodiments.

In another embodiment, upon receiving a corrupted message, the receiver can calculate a distance value and a direction value according to the modulation of each message element relative to the nearest state of the modulation scheme. To attempt to recover the corrupted message, the receiver can select the message element with the largest distance value, and can alter that message element's state assignment to an adjacent state according to the direction value, and test that altered version against the error-detection code. The receiver can then alter other message element assignments according to their distance values, starting with the largest distance values, and altering each of the message elements to adjacent states according to the direction value. The receiver can perform a nested search among the message elements with distance values exceeding a threshold, for example, testing each such combination. If not successful, the receiver can then alter the message element with the largest distance across all of the states of the modulation scheme, testing each. The receiver can then select further message elements according to distance and vary each according to their direction values or alternatively across the entire modulation scheme, testing each combination. Thus the receiver can select which message elements to alter, and in what order, based on their distance values instead of the good-marginal-bad categories, and the receiver can alter each message element according to the direction value instead of the deviation sectors. In addition, the receiver can calculate how long it will take to perform the alterations, given the number and size of the distance values of the message elements, and can determine whether the amount of time will likely exceed the time required for a retransmission, in which case the receiver may request the retransmission before or concurrently with performing the alterations and tests just described.

In summary, upon receiving a corrupted message, the receiver can determine a good-modulation zone around each state of the modulation scheme, and optionally a marginal-modulation zone around the good-modulation zone, with bad-modulation outside those zones. The receiver can allocate each message element to good, marginal, or bad-modulation quality according to the difference between the amplitude modulation of the message element and the closest amplitude level of the modulation scheme, and according to the difference between the phase modulation of the message element and the closest phase level of the modulation scheme. The receiver can also determine a direction for each message element according to the difference between the amplitude modulation of the message element and the closest amplitude level of the modulation scheme, and according to the difference between the phase modulation of the message element and the closest phase level of the modulation scheme. To attempt to recover the corrupted message, the receiver can alter each of the bad or marginal-modulation elements to the next adjacent state of the modulation scheme, in the direction associated with that message element, and can then test the message with that alteration. The receiver can first alter just one message element at a time, and can then alter multiple message elements together in a nested search. If altering the message elements to their directionally-adjacent state fails to agree with the error-detection code, then, the receiver can alter the marginal-modulation elements to each of the remaining adjacent states. This alteration can be done with one marginal-modulation element at first, and then in combination with other marginal-modulation message elements, while testing each such message alteration. If still not successful, the receiver can then alter each marginal-modulation element across all of the non-adjacent states, singly at first, and then in combination, as in a nested search, testing each alteration against the error-detection code. If none of those alterations causes the message to agree with the error-detection code, the receiver can abandon the message or request a retransmission, in some embodiments.

The systems and methods disclosed herein further include procedures for merging a message with a retransmitted copy of the same message. If the retransmitted copy of the message agrees with the embedded error-detection code, then the task is done. However, if both of the message versions disagree with the error-detection code, then the two messages can be merged by taking the message elements with the best modulation quality from each of the two versions. Even if both message versions contain faults, it is likely that the faults will occur in different message elements in the two copies. It is also likely that the faulted message elements will have lower-quality modulation (that is, larger displacement from the nearest state of the modulation scheme) than the correctly received message elements. Therefore, by taking the better-modulation-quality message elements from each of the two versions, the merged message is likely to be fault-free, as demonstrated in the following examples.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways. Detection of such time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

Figure 7:
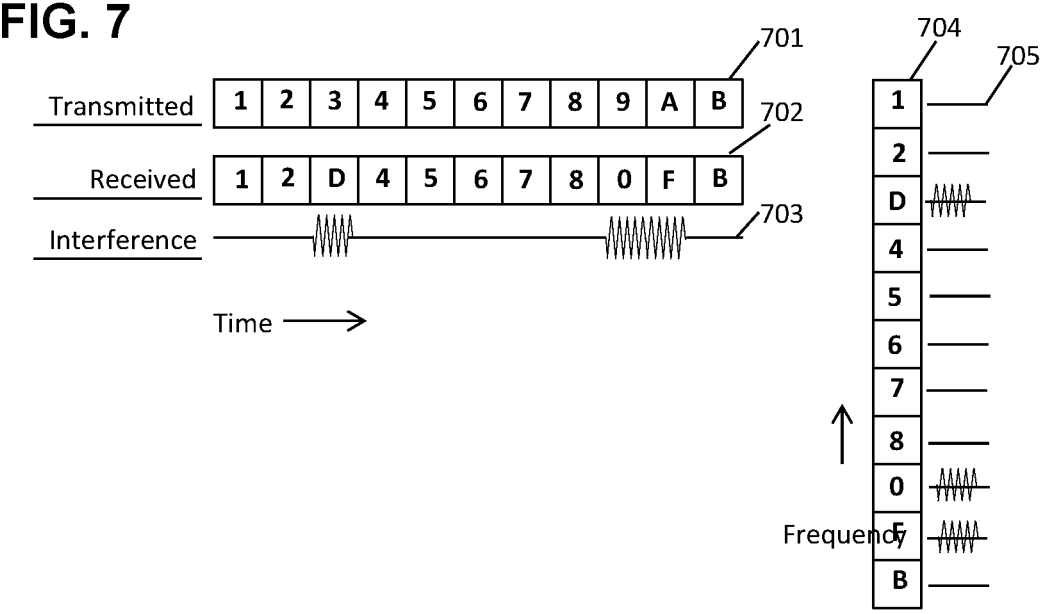
FIG. 7 is a schematic showing an exemplary embodiment of messages with interference faults, according to some embodiments.

FIG. 7 is a schematic showing an exemplary embodiment of messages with interference faults, according to some embodiments. As depicted in this non-limiting example, a message is shown on successive lines, the original message labeled as "Transmitted", and the same message as "Received" with specific faults, and a plot of the interference. A first message 701 is transmitted as time-spanning, that is, occupying successive symbol times at a single frequency. Each message element is modulated according to a hexadecimal character in 16QAM. The original message is "123456789AB" as shown. The received message 702 includes three message elements changed or faulted. The interference 703 is shown as a function of time, with jagged lines indicating when interference is present. The received message 702 indicates that the "3" in the transmitted message 701 has been changed to a "D" in the received version, and the "9" has been changed to a "0", and the "A" has been changed to a "F", due to the interference 703.

Also shown is a second message 704, this example being frequency-spanning, that is, occupying successive subcarriers at a single symbol time. Again, three of the message elements have been changed by interference to different values by the frequency-dependent interference 705 as indicated by jagged lines opposite to the subcarriers affected by the interference. The interference 703 or 705 caused an amplitude change or a phase change or both, resulting in the incorrect demodulation of the three message elements and hence a corrupted message. The task of the systems and methods disclosed herein may be to identify which message elements have been changed by interference, and if possible to determine the original values of the changed message elements.

Figure 8:
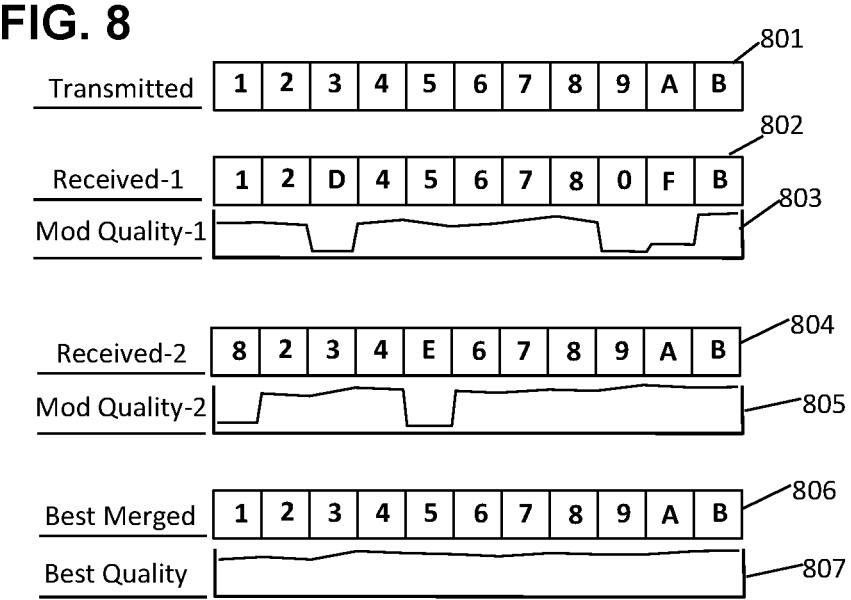
FIG. 8 is a schematic showing an exemplary embodiment of a procedure for merging messages with interference faults, according to some embodiments.

FIG. 8 is a schematic showing an exemplary embodiment of a procedure for merging two messages, each containing multiple interference faults, according to some embodiments. As depicted in this non-limiting example, an original message is shown as-transmitted 801 and time-spanning. The message as-received 802 includes three incorrect characters due to noise or interference. In addition, the receiver has determined the modulation quality of each message element by measuring the amplitude and phase deviations from the nearest state of the modulation scheme. For example, the modulation quality may be inversely related to the distance from the observed modulation to the amplitude and phase levels of the nearest state, so that larger differences are allocated as a lower modulation quality, for example. The faulted message elements are likely to have poor modulation quality, because their modulation has been randomly distorted by the interference. The line chart 803 labeled "Mod Quality 1" shows the modulation quality versus time, determined by the receiver while the message elements are received. Most of the message elements have high modulation quality, but the third, ninth, and tenth message elements have low modulation quality due to the distortion effects of interference.

The receiver can determine that the received message 802 is corrupted using an appended or embedded error-detection code (not shown), and has requested a retransmission of the same message 801. The second copy 804, labeled "Received-2", also has errors. Specifically, the first and fifth message elements are now changed by the ongoing bursty interference. The observed modulation quality during the second reception 805 is shown, indicating poor modulation quality during those two altered message elements.

To recover the original message, the receiver can merge the two messages 802, 804. For each message element of the merged message, the receiver can compare the modulation quality of the corresponding message elements of the first and second messages, and can select whichever version has the better modulation quality. Faulted message elements generally have low modulation quality, as mentioned. The merged message 806 is shown as "Best Merged", obtained by selecting each message element from the first or second copy with higher modulation quality. In this case, and in most cases of practical concern, the two message copies have faults in different message elements. Thus each of the faulted message elements in the Received-1 message are unfaulted in the Received-2 message, and each of the faulted message elements in the Received-2 message are unfaulted in the Received-1 message. For example, the receiver can select the first message element from Received-1 since it has a better modulation quality than the first message element in Received-2, and can select the third message element in Received-2, the fifth in Received-1, and so forth, selecting the better-quality version for each message element in the merged message. By preparing the merged message by selecting the better quality version for each message element, all of the faults have been removed in the merged message 806 as indicated by the "Best Quality" chart 807. Therefore the merged message 806 is correct and passes the error-detection test.

Rarely, the first and second messages may have a fault in the same message element position, in which case the merged message will also contain that fault. In that case, the receiver can try various procedures. For example, the receiver can determine a direction based on the amplitude and phase modulation of each marginal-modulation message element, the direction being relative to the closest state. The receiver may alter that message element in the direction indicated, and may thereby test the adjacent state in the indicated direction. Such a test may mitigate small distortions in amplitude or phase, which generally shift a message element to an adjacent state. Such an adjacent-state test, altering the assigned state of certain message element in an indicated way, may be quicker than an exhaustive search. If that fails, the receiver can alter the suspicious message elements to each of the other nearest-neighbor states and test each of those combinations against the error-detection code, which may mitigate larger distortions than the test based on the indicated direction. If that fails, the receiver may vary the suspicious message element across all of the remaining states of the modulation scheme, testing each against the error-detection code. In these ways, the receiver may determine the correct value and mitigate the remaining faults without requiring transmission of a completely error-free received version, and without having to request and wait for a third transmission.

It may be noted that prior-art methods for merging messages, such as "soft combining", generally do not measure or use the modulation quality in determining the values of the merged message elements. Instead, the prior-art procedures generally involve averaging the raw amplitude and phase values of the received message elements. However, the statistical improvement in such blind averaging is at most $\sqrt{N}$, where N is the number of copies being averaged, and this improvement is generally obtained only when the distortions are random and Gaussian distributed. For common cases in which the distortions are caused by bursty and frequency-rich interference, averaging additional copies can actually increase the errors in the merged message by adding new distortions to the message elements. The disclosed procedure avoids this problem by selecting the best modulation quality message elements from each of the received copies, without averaging. Since a correct message element is more likely to have a high modulation quality, and a faulted message element is more likely to have a poor message quality, the improvement tends to be proportional to N, instead of $\sqrt{N}$. Embodiments of the disclosed procedure, for exploiting the modulation quality to select message elements for the merged message, can therefore provide a significant reliability improvement in high-background environments or when reception is weak, such as when a user device is at long range from a base station, or when the transmitter is obscured by an obstruction, for example.

In some embodiments, the receiver may merge two versions of a message by selecting which version of each message element to insert into the merged message, the selecting being according to an algorithm. For example, the algorithm may take, as input, the SNR of the message element's signal, and the modulation quality as measured by the amplitude and phase deviations relative to the nearest state of the modulation scheme, and other measures of demodulation fidelity. The algorithm may provide, as output, an overall quality parameter, and the receiver may select which of the message element versions to include in the merged message according to that overall quality parameter. As a further option, the receiver may monitor the amplitudes of the message elements when the modulation scheme is phase-only, such as BPSK or QPSK which do not include amplitude modulation. If a message element has an amplitude that differs substantially from the other message element amplitudes, the deviating message element may be suspect even if the phase is within the good-modulation zone of one of the states of the modulation scheme, since the amplitude variation may be an indication of interference. In addition, the algorithm may include, in its inputs, the amplitudes of the message elements (when the modulation is phase-only) and may calculate the overall quality of each message element accordingly.

Figure 9:
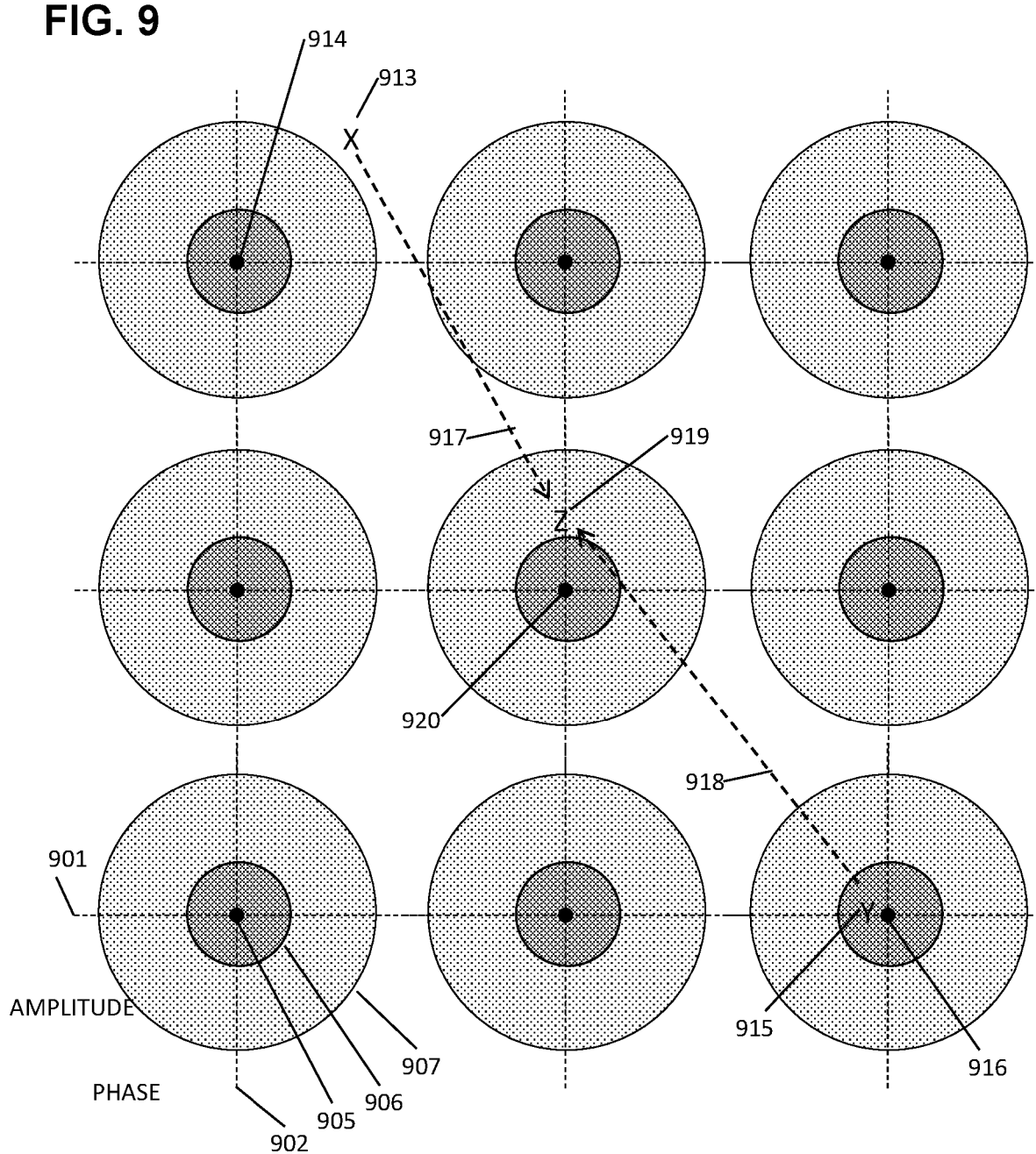
FIG. 9 is a schematic showing an exemplary embodiment of a modulation table with message faults, according to some embodiments.

FIG. 9 is a schematic showing an exemplary embodiment of a modulation table with message faults, according to some embodiments. As depicted in this non-limiting example, a portion of a modulation table is shown with amplitude levels 901 and phase levels 902, including states 905, good-modulation zones 906 in dark stipple, and marginal-modulation zones 907 in light stipple. A message is received with a message element indicated as the "X" 913 which is in the bad-modulation zone exterior to all of the marginal-modulation zones 907. The correct value for that message element is a distant state marked 916, but there is no way for the receiver to know that fact. Instead, the receiver has assigned the message element 913 to the closest state, which is 914.

Due to the incorrect assignment of the message element, the received message failed the error-detection test. The receiver requests and obtains a retransmission. In the second copy, the message element is modulated as the "Y" 915, which is in the good modulation zone of the correct state 916. Without determining the modulation quality, the receiver has no way to know which of the versions, X or Y (913, 915) is correct, or if either is correct. Therefore, using soft-combining or other averaging-based procedure, the receiver may average the two versions as indicated by dashed arrows 917, 918, thereby obtaining an averaged message element "Z" 919. Since the averaged element 919 is close to a state 920, the receiver may assign the message element to state 920. However, this assignment is still incorrect, since the correct state is 916. Averaging a correct reception with an incorrect reception usually does not solve the problem. Using a signal averaging technique, absent the systems and methods disclosed herein, the receiver may require many additional retransmissions to finally determine that the correct state is 916, a substantially time-consuming process.

In contrast, the procedure disclosed herein, selecting the merged message elements according to modulation quality, may avoid such delays. For example, the receiver may select which version of each message element to use in the merged message, according to modulation quality. In the depicted case, the receiver would select "Y" 915 in the merged message because the "Y" is in the good-modulation zone of state 916, the correct value. Selecting between two message versions according to the modulation quality of each message element individually, may thereby resolve the faults in the merged copy.

A key difference between the disclosed method and prior art methods may be that prior art methods generally discard valuable information, specifically the modulation quality, which the current procedure exploits to advantage.

Figure 10:
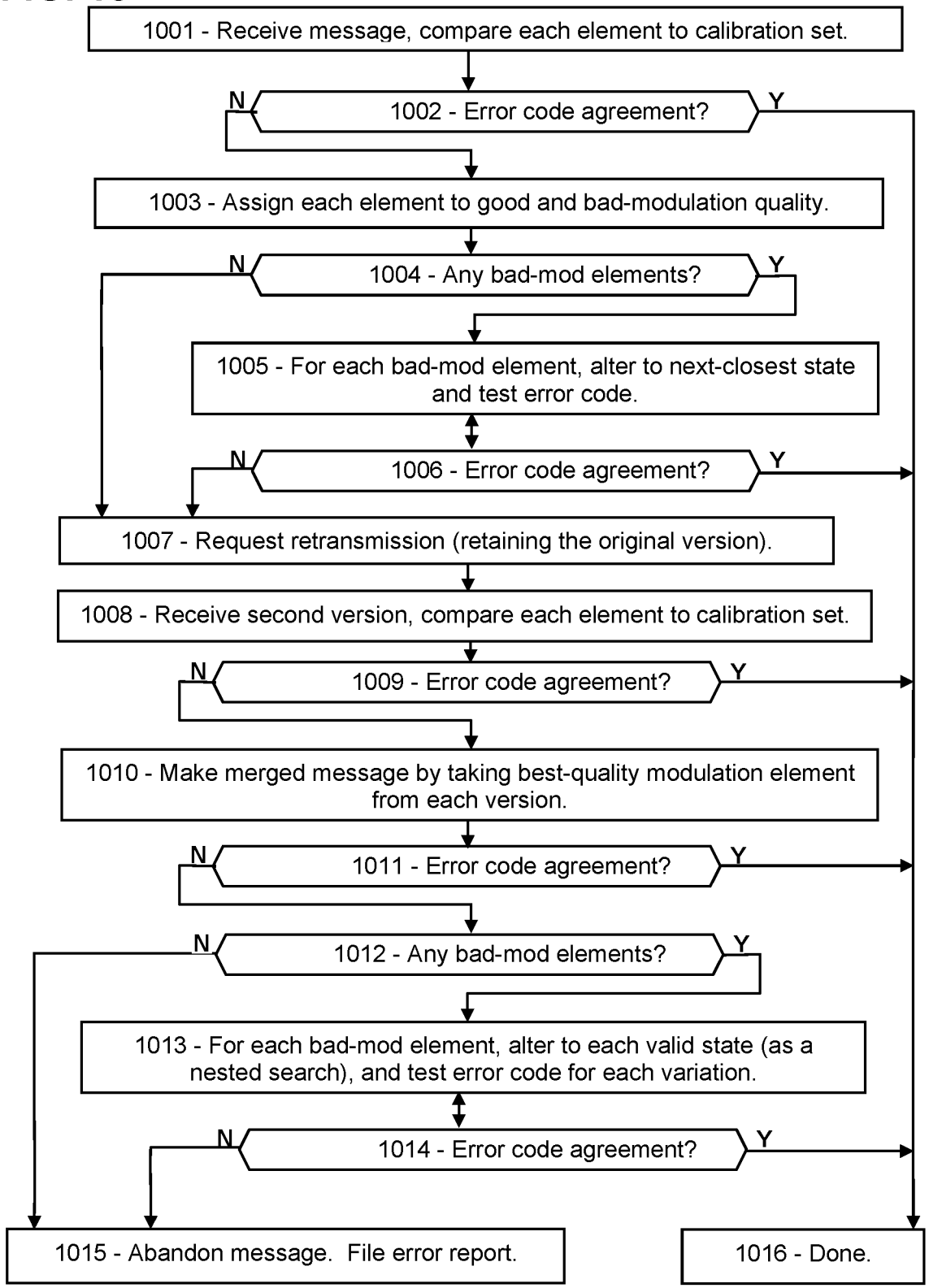
FIG. 10 is a flowchart showing an exemplary embodiment of a process for detecting and correcting message errors by merging copies, according to some embodiments.

FIG. 10 is a flowchart showing an exemplary embodiment of a process for detecting and correcting message errors by merging two transmitted versions, according to some embodiments. As depicted in this non-limiting example, a receiver receives a message at 1001 and demodulates it using a calibration set that includes the amplitude and phase levels of the modulation scheme. The receiver then, at 1002, compares the message to an embedded error-detection code and, if agreed, drops to 1016 and is done. If not, the receiver may assign, to each message element, a modulation quality according to how close the message element amplitude and phase modulations are to the closest amplitude and phase levels in the calibration set. For example, the receiver may assign good-modulation quality to message elements which are within a predetermined distance from the nearest state, and bad-modulation quality to those farther from the nearest state, at 1003.

At 1004, the receiver determines whether the message includes any bad-modulation message elements. If the message elements are all good-modulation quality elements, yet the message is still corrupted as determined by the error-detection code, then the receiver has little choice but to request a retransmission at 1007. However, if at 1004 one or more of the message elements has bad-modulation quality, then at 1005 the receiver can alter each of the bad-modulation elements to the next-closest state and test that altered version at 1006. (The "next-closest" state is the state that is closer than any of the other states, other than the closest state.) The receiver can test each of the bad-modulation elements individually or in combinations, as in a nested grid search, as indicated by the double-ended arrow. If any of those combinations agrees with the error-detection code, the task is done. If not, the receiver requests a retransmission at 1007.

At 1008, the receiver demodulates the second copy of the message and tests it against the error-detection code at 1009. If in agreement, the task is done. If not, the receiver can merge the first and second copies by selecting whichever message element, of the first and second copy, has the better modulation quality at 1010. The receiver can then, at 1011, test whether the merged message agrees with the error-detection code. Since the error-detection code is generally the same for the first and second messages, either version of the error-detection code can be used. If, however, a fault occurs in the error-detection code of one of the versions, then the receiver can repair it by taking the best modulation quality version of each message element (including the message elements of the error-detection code) in constructing the merged message, and may use that repaired code for testing the merged message.

If at 1011 the message is still corrupted, the receiver can then determine whether the merged message has any bad-modulation elements at 1012. If there are still some bad-modulation elements in the merged message at 1012, and if the number of remaining bad-modulation elements is less than a predetermined limit, the receiver can alter each bad-modulation element to each of the states at 1013. The receiver can alter the remaining bad-modulation elements singly or in combination, and can test each variation against the error-detection code at 1014, as indicated by a double-ended arrow. In addition, the receiver can determine whether there are any paradoxical message element, which differ between the two message versions but is good-mod in both versions. The receiver can re-allocate those message elements as suspicious for further alterations and testing. If one of those variations succeeds, the task is done at 1016. If not, or if there are no bad-modulation elements to vary at 1012, the receiver may abandon the message at 1015 and file an error report.

In various embodiments, if all of the merged message elements are good modulation, yet the message still fails the error-detection test, then the receiver can either request a third copy, or begin varying the good-modulation message elements at random, or abandon the message. In most cases it is not feasible to vary the good-modulation elements across all the states in a grand nested search, because (a) it would take too long, and (b) one of those variations may accidentally agree with the error-detection code. In addition, there is generally a limit to the number of retransmissions that a receiver can request. Therefore, in this case, the receiver files an error report, which may assist the network in finding whatever caused the problem, and abandons the message at 1015.

Figure 11:
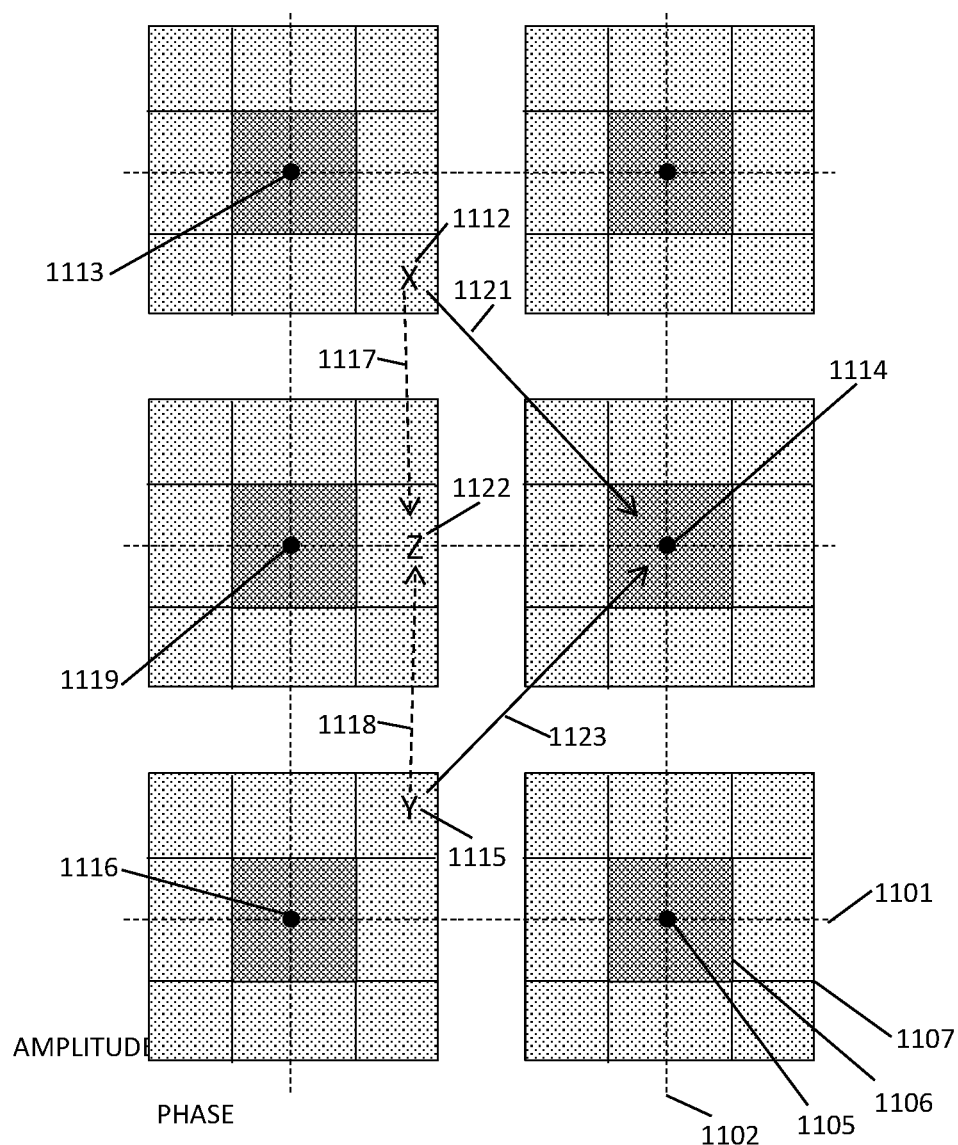
FIG. 11 is a schematic showing an exemplary embodiment of a modulation table with message faults and directional information, according to some embodiments.

In some embodiments, the receiver may determine which message elements to include in the merged message, and which message elements to alter, according to an overall quality factor, which may depend on the modulation quality of each message element, the SNR of each message element's signal, the amplitude variation of each message element relative to other message elements (for phase-only modulation), among other factors. The receiver may use an algorithm to determine which message elements to merge and/or alter. The algorithm may take, as input, the modulation quality, the SNR, and optionally the amplitude variation. The algorithm may provide, as output, the overall quality of each message element. The receiver may then use that output to select message elements for a merged message and/or to select which message elements to alter the state assignments of FIG. 11 is a schematic showing an exemplary embodiment of a modulation table and messages with message faults and directional information, according to some embodiments. As depicted in this non-limiting example, a receiver determines a direction in amplitude-phase space, according to the modulation of a message element relative to the nearest state of the modulation scheme. Then, by combining the direction information from two corrupted retransmissions, the receiver can determine the correct state of the message element, in some embodiments.

The figure shows a portion of a modulation table with amplitude levels 1101 and phase levels 1102 defining a number of states 1105 surrounded by good modulation zones 1106 in dark stipple, surrounded by marginal modulation zones 1107 in light stipple and divided into sectors by lines as shown. The receiver receives a first message with a particular message element modulated as "X" 1112, which is assigned to state 1113 since it is the closest one. However, due to interference, the message element has been distorted, and the assignment of state 1113 is incorrect. The correct value for that message element is an adjacent state 1114. Therefore, with the faulted message element, the message fails the error-detection test, and the receiver requests and receives a retransmission of the same message.

In the retransmitted copy of the message, the message element is now modulated as "Y" 1115 due to continuing interference, and is again assigned to the closest to the state, which is now state 1116. However, this is also incorrect. With that incorrect assignment, the message again fails the error-detection test. The receiver can then follow a prior-art procedure of averaging the two versions of the message. As indicated by dashed arrows 1117, 1118, the averaged message element Z 1122 would be assigned to its closest state, which is the state 1119. This is also incorrect. Alternatively, the receiver may use a different prior-art protocol in which the assigned states 1113 and 1116 are averaged instead of the raw modulation values, but that method again ends up being assigned to 1119, and the message again fails the error-detection test. Without further information, the receiver can then either request a third transmission or abandon the message.

The disclosed methods may provide a better solution. For example, the receiver may determine a direction from the modulation state of the X 1112 relative to the closest state 1113, as indicated by a solid arrow 1121. The receiver can also determine another direction 1123 according to the Y modulation 1115 relative to the closest state 1116. Following those directions 1121 and 1123, the receiver may thereby determine that the message element should be the state 1114, which in this case is correct. Hence by determining directions based on the modulation of faulted message elements, and determining where those directions lead, the receiver may correctly demodulate the message despite repeated faults in the same message elements, according to some embodiments.

Figure 12:
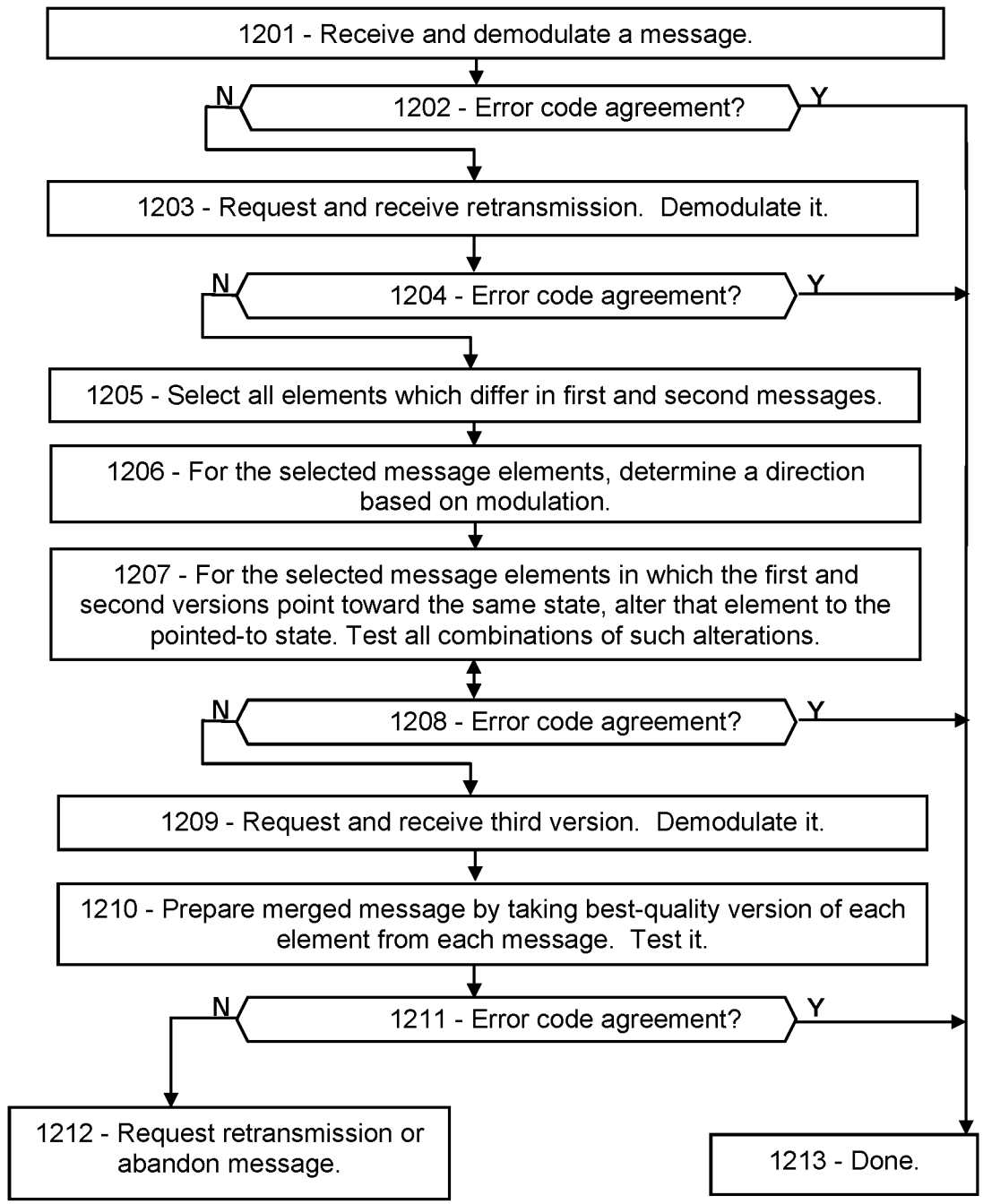
FIG. 12 is a flowchart showing an exemplary embodiment of a process for detecting and correcting message errors by merging copies using directional information, according to some embodiments.

FIG. 12 is a flowchart showing an exemplary embodiment of a process for detecting and correcting message errors by merging copies using directional information, according to some embodiments. As depicted in this non-limiting example, at 1201 a receiver receives a message, demodulates it, and at 1202 tests the message against an error-detection code. If the message passes, the task is done at 1213. If not, the receiver may request a retransmission at 1203, demodulate it, and test the second copy at 1204. If the second copy also fails, the receiver may, at 1205, select each element which differs in the first and second copy and mark them as suspicious. Alternatively, the receiver may check the modulation states of the elements and determine that the message element has bad modulation quality in both of the message versions. In either case, at 1206, the receiver can analyze the amplitude and phase modulations of each suspicious message element, relative to the nearest state of the modulation scheme, and thereby determine a direction in phase-amplitude space. At 1207, the receiver may determine whether the directions, as determined for the first and second copies of each suspicious message element, point toward the same state. The receiver may alter the message element's assignment to that pointed-to state, and then test that variation against the error-detection code. If there are multiple suspicious elements in the merged message, the receiver may vary each of the suspicious elements singly or in combinations, in a nested grid search as indicated by the double-ended arrow, testing each combination. If all variations fail, at 1208, the receiver may then, at 1209, request a third copy of the message. The receiver may test the third received copy against the error-detection code and, if it fails again, the receiver may then prepare a merged message at 1210 by selecting the "best" value of each message element from among the three versions. For example, if two of the three copies are in agreement as to which state a message element is closest to, then that message element of the merged message may be assigned to the indicated state. Alternatively, the best value may be based on the modulation quality, in which the version with the highest modulation quality is selected for the merged message. In addition, if two of the message elements indicate directions according to their modulations, and the directions indicate a particular state, the receiver may assign that state to the message element in the merged message, even if none of the copies actually contains that state. After preparing the merged message by these strategies, the receiver may test the merged message at 1211 and, if successful, is done at 1213, and if not, may abandon or request one more retransmission (if not yet at the limit), or other failure mode protocol, at 1212.

In some embodiments, the receiver may monitor the background noise or interference level and determine that the backgrounds are higher than normal. Then, before requesting a second or third or other retransmission, may wait until the background has subsided, and then may request the retransmission. The transmitting and receiving entities may have agreed to store transmitted messages until getting a positive acknowledgement, for at least a certain storage time. Then, if the receiver determines that the background has returned to normal, or if the storage time is about to expire, can request the retransmission at that time.

In summary, a receiver can test a received message against an embedded error-detection code, determine that the message is corrupted, request and receive a second copy of the message, and determine that the second copy is also corrupted. The receiver can allocate each message element of the first and second messages to categories such as good, marginal, or bad modulation quality according to the difference between the amplitude and phase modulation of the message element, and the closest amplitude and phase levels of the modulation scheme, or a mathematical function of those differences. The receiver can then prepare each message element of a merged message by selecting whichever of the corresponding elements in the first and second messages, has the best modulation quality. Since a faulted message element generally exhibits lower quality modulation than correctly transmitted message elements, the merged message is expected to contain fewer (usually zero) remaining faults. In addition, the receiver can determine a direction associated with each message element of the messages, according to the modulation of the message element relative to the nearest state of the modulation scheme, and can correlate the directions of a particular message element in the two messages to identify the correct modulation state of the message element, in some embodiments.

Systems and methods disclosed herein are aimed at improving the error detection capability of receivers in 5G and 6G communications, and recovering faulted messages without a massive search. The receiver may allocate each message element to a good, marginal, or bad-modulation quality based on how far the element's modulation differs from the closest amplitude and phase levels of the modulation state. The receiver may attempt to recover a faulted message by altering the assigned state of a message element that exhibits marginal or bad-modulation quality. The receiver may initially alter the suspicious message elements to their immediately adjacent states, and thereby test the most likely effects of low-level noise and interference. In addition, the receiver may determine a direction according to each message element's modulation, and may vary each modulation element according to the direction indicated. In most cases, it is much quicker to resolve the faults by varying just the message elements with the lowest modulation quality, because these are the most likely to be the faulted elements. The systems and methods may enable recovery of messages that would otherwise be discarded or retransmitted, thereby reducing delays, substantially improving reliability under adverse noise or interference conditions, and avoiding unnecessary requests and retransmissions. Network efficiency may be improved thereby, and user satisfaction may be provided, with little or no additional cost, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable marginal may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing marginal. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for correcting a fault in a wireless message, comprising:
receiving a first copy of the message and determining that the first copy is corrupted;
then receiving a second copy of the message and determining that the second copy is corrupted;
determining, for each message element of the first and second copies, a modulation quality according to a difference between a modulation of the message element and a modulation level of a modulation scheme; and
creating a merged message by selecting, for each message element of the merged message, from the corresponding message elements of the first and second copies, whichever message element has higher modulation quality;
wherein the modulation of the message element comprises a first amplitude value or a first phase value or both, the modulation level of the modulation scheme comprises a second amplitude value or a second phase value or both, and the modulation quality of the message element comprises a difference between the first and second amplitude values, or a difference between the first and second phase values or both.

2. The method of claim 1, further comprising:
determining one or more sectors according to an amplitude modulation or a phase modulation or both; and determining, according to each sector, a direction comprising an alteration in amplitude modulation or phase modulation or both.

3. The method of claim 2, further comprising:

altering a message element of the merged message according to the direction; and determining whether the merged message, so altered, is corrupted.

4. The method of claim 1, wherein the selecting comprises comparing the modulation quality of a particular message element of the first message to the modulation quality of the corresponding message element of the second message, and selecting whichever of the compared message elements has a higher modulation quality.

* * * * *